United States Patent
Lee et al.

(10) Patent No.: US 9,094,475 B2
(45) Date of Patent: Jul. 28, 2015

(54) METHOD FOR STORING CONVERSATION UPON USER'S REQUEST IN CPM SYSTEM, AND SYSTEM THEREOF

(75) Inventors: Seung-Yong Lee, Seoul (KR);
Kyung-Tak Lee, Yongin-si (KR);
Sung-Jin Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 597 days.

(21) Appl. No.: 12/781,534

(22) Filed: May 17, 2010

(65) Prior Publication Data
US 2010/0293240 A1    Nov. 18, 2010

(30) Foreign Application Priority Data
May 15, 2009   (KR) .................. 10-2009-0042860

(51) Int. Cl.
H04L 29/06    (2006.01)
H04L 12/58    (2006.01)
H04L 12/18    (2006.01)
H04M 3/42    (2006.01)

(52) U.S. Cl.
CPC .......... *H04L 65/403* (2013.01); *H04L 12/1827* (2013.01); *H04L 51/04* (2013.01); *H04L 65/1069* (2013.01); *H04M 3/42221* (2013.01); *H04L 65/1006* (2013.01); *H04L 65/1093* (2013.01)

(58) Field of Classification Search
CPC ........... H04L 65/1093; H04L 65/1006; H04L 12/1827; H04L 51/04; H04L 65/403; H04L 65/1069; H04M 3/42221
USPC .................. 709/204, 206, 227, 228, 220, 229
See application file for complete search history.

(56) References Cited

U.S. PATENT DOCUMENTS

| | | | | |
|---|---|---|---|---|
| 6,870,905 B2 * | 3/2005 | Pelaez et al. | ..................... | 379/35 |
| 7,711,848 B2 * | 5/2010 | Maes | ............................ | 709/239 |
| 8,099,089 B2 * | 1/2012 | Sedlacek et al. | ............. | 455/416 |
| 8,140,100 B2 * | 3/2012 | Wang | ............................ | 455/518 |
| 8,225,000 B2 * | 7/2012 | Xu et al. | ....................... | 709/248 |
| 8,401,005 B2 * | 3/2013 | Zhu et al. | ...................... | 370/352 |
| 8,799,486 B2 * | 8/2014 | Eom et al. | ..................... | 709/228 |
| 2003/0061319 A1 * | 3/2003 | Manzardo | ..................... | 709/221 |
| 2003/0069982 A1 * | 4/2003 | Harper et al. | ................. | 709/228 |
| 2003/0126213 A1 * | 7/2003 | Betzler | ......................... | 709/206 |
| 2004/0003046 A1 * | 1/2004 | Grabelsky et al. | ............ | 709/206 |
| 2004/0037406 A1 * | 2/2004 | Gouraud | ................. | 379/202.01 |
| 2004/0207724 A1 * | 10/2004 | Crouch et al. | ............ | 348/14.09 |

(Continued)

FOREIGN PATENT DOCUMENTS

WO    WO 2009134051 A1 *  11/2009  .............. H04L 29/06

OTHER PUBLICATIONS

Sumanta Saha, Deploying OMA Converged IP Messaging over IMS: Integration Plan and Architecture, 2008, IEEE.*

*Primary Examiner* — Jimmy H Tran
(74) *Attorney, Agent, or Firm* — The Farrell Law Firm, P.C.

(57) ABSTRACT

A method for storing a conversation upon a user's real-time request in a Converged-IP Messaging (CPM) service is provided. The method includes storing a conversation in a message storage server on a network or stopping the storage of the conversation upon a user's request. A target that can be stored within a conversation includes a pager mode message, a large message, and media delivered through the session. In this manner, media in the conversation may be limited to media selected by a user.

20 Claims, 14 Drawing Sheets

(56) References Cited

U.S. PATENT DOCUMENTS

| | | |
|---|---|---|
| 2006/0046758 A1* | 3/2006 | Emami-Nouri et al. ...... 455/518 |
| 2006/0089971 A1* | 4/2006 | Wilensky ...................... 709/206 |
| 2007/0100952 A1* | 5/2007 | Chen et al. .................... 709/207 |
| 2007/0118660 A1* | 5/2007 | Garcia-Martin .............. 709/227 |
| 2007/0136479 A1* | 6/2007 | Miller ........................... 709/227 |
| 2007/0258477 A1* | 11/2007 | Huh ............................... 370/416 |
| 2007/0291786 A1* | 12/2007 | Maes ............................. 370/465 |
| 2008/0170563 A1* | 7/2008 | Zhu et al. ...................... 370/352 |
| 2008/0219283 A1* | 9/2008 | Eom et al. ..................... 370/432 |
| 2008/0248763 A1* | 10/2008 | Park et al. .................... 455/90.2 |
| 2009/0047985 A1* | 2/2009 | Wang ............................ 455/518 |
| 2009/0048845 A1* | 2/2009 | Burckart et al. ............. 704/270 |
| 2009/0052455 A1* | 2/2009 | Kim ............................... 370/392 |
| 2009/0067408 A1* | 3/2009 | Leppainen et al. ............ 370/350 |
| 2009/0106455 A1* | 4/2009 | Xu et al. ........................ 709/248 |
| 2009/0125589 A1* | 5/2009 | Anand et al. .................. 709/204 |
| 2009/0204673 A1* | 8/2009 | Tian et al. ..................... 709/204 |
| 2009/0279455 A1* | 11/2009 | Wang et al. ................... 370/260 |
| 2009/0286516 A1* | 11/2009 | Sedlacek et al. ............ 455/414.1 |
| 2009/0327247 A1* | 12/2009 | Jia et al. ............................ 707/3 |
| 2010/0215036 A1* | 8/2010 | Eom et al. ..................... 370/352 |
| 2010/0312832 A1* | 12/2010 | Allen et al. ................... 709/204 |
| 2011/0047280 A1* | 2/2011 | Eom et al. ..................... 709/228 |
| 2011/0191487 A1* | 8/2011 | Ziems ........................... 709/231 |
| 2011/0295965 A1* | 12/2011 | Eom et al. ..................... 709/206 |
| 2014/0379827 A1* | 12/2014 | Eom et al. ..................... 709/206 |

* cited by examiner

METHOD FOR STORING CONVERSATION UPON USER'S REQUEST IN CPM SYSTEM, AND SYSTEM THEREOF

PRIORITY

This application claims priority under 35 U.S.C. §119(a) to a Korean Patent Application filed in the Korean Intellectual Property Office on May 15, 2009 and assigned Serial No. 10-2009-0042860, the entire content of which is incorporated herein by reference.

BACKGROUND OF THE INVENTION

1. Field of the Invention

The present invention relates to a method and system for storing a conversation upon a user's request in a Session Initiation Protocol (SIP)-based messaging service.

2. Description of the Related Art

In a Session initiated protocol for Instant Messaging and Presence Leveraging Extensions (SIMPLE) Instant Messaging (IM) service, an IM user may request to store a session in a network storage unit. Such a user request may occur while the session is in progress. If the IM user requests storage of the session, an IM Controlling Function (CF) allows a server to participate in the IM session, and then the server stores media received through the IM session. In this manner, a function of storing a session upon a user's request is provided in the SIMPLE IM service.

Since a Converged-Internet Protocol (IP) Messaging (CPM) service supports a multimedia session capable of transmitting receiving different types of media through a single media session, a user should be able to request to store only particular media selected from the different types of media transmitted and received in the multimedia session. The CPM service provides primary service features for a variety of messaging services including a Short Messaging Service (SMS), a Multimedia Messaging Service (MMS) and an Instant Messaging Service (IMS), in the form of a single service. The CPM service provides three different kinds of communication modes such as a pager mode, a large message mode, and a session mode, to deliver messages between users.

Among the three different kinds of services provided to users, the pager mode is a scheme suitable for delivering small-sized content, and in this scheme, messages are delivered through an SIP MESSAGE method. The large message mode is a scheme appropriate for delivering a large amount of content, and the large message mode establishes or sets up a one-way session by transmitting an SIP INVITE, and then ends the session when the content delivery is completed. Since only one content can be transmitted or delivered through one large message session, a predetermined number of large message sessions are needed to transmit the same number of contents. The session mode is a scheme for establishing an interactive session between users and then exchanging content through the established session. The established session ends only when certain conditions, for example, user's session end request and session expiration, are satisfied, enabling a conversational exchange of content between users.

As described above, the SIMPLE IM service provides a function for storing a session upon a user's request, but a method of storing messages transmitted/received in the pager mode and the large message mode has never been described in detail. Even though the SIMPLE IM service includes a function of storing messages upon a user's request in the session mode, the SIMPLE IM service does not include a function that allows a user to designate and store only a particular type of media among the media included in the session. Such a function may be considered unnecessary in the IM service, since IM services primarily use only text-type content in single-media sessions.

However, in the CPM service, for example, when two service users are performing a video call with each other through a multimedia session, either user may request to store both voice and video information, even when the user may wish to store only one of the voice information and the video information. If the data storage space in the network is insufficient for storing a large amount of both voice and video information, electing to store only the voice information, which is relatively smaller in data size than a combination of both voice and video information, could be beneficial in terms of the service use by the user.

In light of the increasing number of SIP-based services, it may be more convenient to provide services reflecting a user's intentions in storing media from an established session. Therefore, there is a need for a method capable of selectively storing a multimedia session or particular media included in the session in the session mode, as well as storing messages in the pager mode and the large message mode, upon a user's request.

SUMMARY OF THE INVENTION

An aspect of the present invention is to address at least the above-mentioned problems and/or disadvantages and to provide at least the advantages described below. Accordingly, an aspect of the present invention provides a method for storing conversation upon a user's request in a CPM system, and a system thereof.

In accordance with one aspect of the present invention, there is provided a method, performed by a server in a Converged-Internet Protocol (IP) Messaging (CPM) system, for storing a conversation upon a user's request. The method includes, upon receiving a message from a first client, determining whether conversation store request information is included in the received message; transmitting a session establishment request message to each of the first client and a second client, when the conversation store request information is included in the received message; and when a session between each of the first and second clients is established through the server, storing, from among media transmitted through the established sessions, media corresponding to the conversation store request information among media transmitted through the established sessions, wherein one of the session establishment request messages is a session establishment request message for replacing an ongoing session between the first and second clients with a new session between the server and one of the first and second clients.

In accordance with another aspect of the present invention, there is provided a method, performed by a first client in a Converged-Internet Protocol (IP) Messaging (CPM) system, for storing a conversation upon a user's request. The method includes after a session for transmitting multimedia data is established between the first client and a second client, receiving a request to store at least one media among the multimedia data transmitted through the session; upon receiving the request to store at least one media, generating a message including conversation store request information for requesting to store the requested medium from the multimedia data; transmitting the generated message to a server; establishing a session with the server such that the server stores media corresponding to the conversation store request information; and releasing the ongoing session established between the first and second clients, when the session establishment with the server is completed.

In accordance with a further another aspect of the present invention, there is provided a server for storing a conversation upon a user's request in a Converged-IP Messaging (CPM) system. The server includes an interface for transmitting and receiving messages to/from first and second clients; and a controller for, upon receiving a message from the first client, determining whether conversation store request information is included in the received message, transmitting a session establishment request message to each of the first and second clients when the conversation store request information is included in the received message, and when a session between each of the first and second clients is established through the server, storing, from among media transmitted through the established sessions, media corresponding to the conversation store request information, wherein one of the session establishment request messages is a session establishment request message for replacing an ongoing session between the first and second clients with a new session between the server and one of the first and second clients.

In accordance with yet another aspect of the present invention, there is provided a first client for storing a conversation upon a user's request in a Converged-Internet Protocol (IP) Messaging (CPM) system. The first client includes an interface for transmitting and receiving a message, and exchanging multimedia data transmitted through a session; and a controller for, after a session for transmitting multimedia data is established between the first client and a second client, upon receiving a request for storing at least one medium from the multimedia session, generating a message including conversation store request information for requesting to store the requested media from the multimedia data and transmitting the generated message to a server, and releasing the ongoing session established between the first and second clients after completely establishing a session with the server such that the server stores media corresponding to the conversation store request information.

BRIEF DESCRIPTION OF THE DRAWINGS

The above and other aspects, features and advantages of certain embodiments of the present invention will be more apparent from the following description taken in conjunction with the accompanying drawings, in which.

DETAILED DESCRIPTION OF EMBODIMENTS

Figure 1:
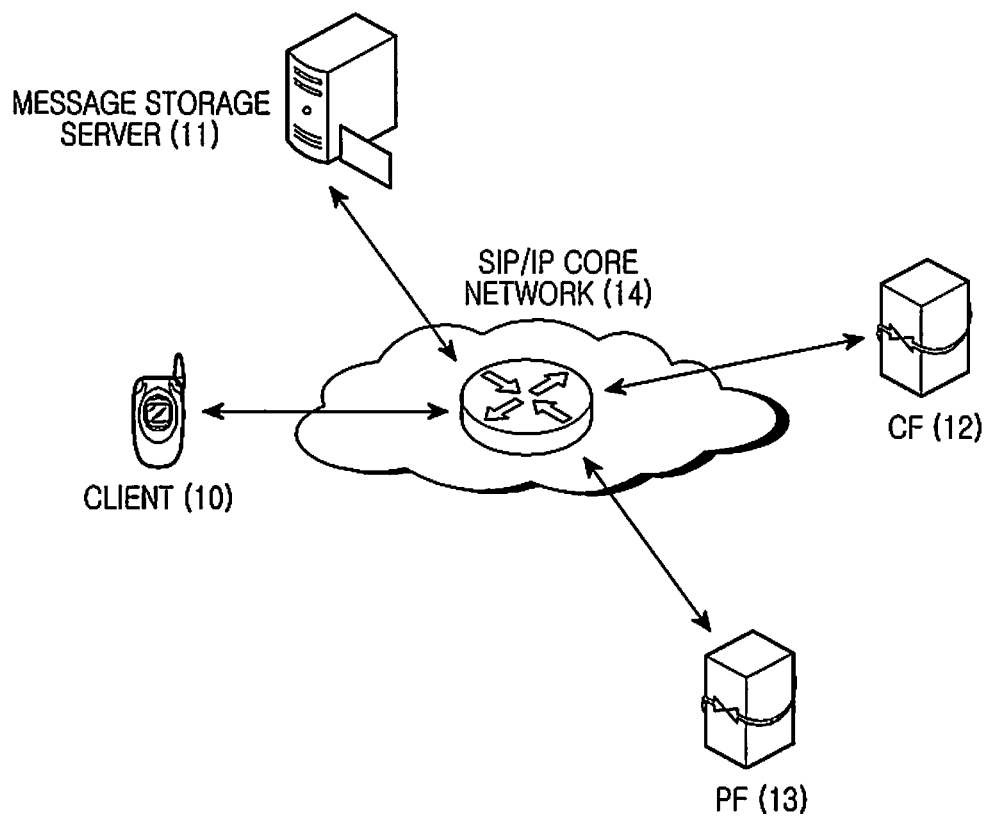
FIG. 1 is a diagram illustrating a system configuration in an SIP-based service environment according to an embodiment of the present invention.

Embodiments of the present invention will now be described in detail with reference to the accompanying drawings. It should be noted that throughout the drawings, the same drawing reference numerals refer to the same elements, features and structures. In addition, descriptions of well-known functions and constructions are omitted for clarity and conciseness.

The present invention provides a method for storing conversation upon a user's real-time request in a Converged-IP Messaging (CPM) service. To be specific, the present invention includes a process of storing conversation in a message storage server in the network or stopping the storage upon a user's request. Herein, the target that can be stored as a conversation may include a pager mode message, a large message, and the media delivered through a session. In the present invention, a user may elect to store only the message or media that the user wants to store.

A conversation and a conversation history according to embodiments of the present invention are described in brief as follows. Table 1 below is a reference for concepts of the conversation and the conversation history in the following description, defined according to the CPM service.

TABLE 1

| | |
|---|---|
| CPM Conversation | The exchange of CPM Messages and/or CPM Sessions, associated with each other due to common characteristics, between two or more Participants (e.g., CPM Users or Applications) |
| CPM Conversation History | Stored representation of a CPM Conversation |

In the CPM service, a conversation is identified by a conversation IDentifier (ID), which is entered in a Conversation-ID header of Common Presence and Instant Messaging (CPIM) content. In the CPM service, for example, a pager mode message (MESSAGE) and a session establishment request message (INVITE) have CPIM content included in their respective body parts.

An example of the CPIM content attached to the body part of the MESSAGE or INVITE message are as shown in Table 2.

TABLE 2 m: Content-type: Message/CPIM
s:
h: From: MR SANDERS <sip:piglet@100akerwood.com>
h: To: Depressed Donkey <sip:eeyore@100akerwood.com>
h: DateTime: 2000-12-13T13:40:00-08:00
h: Subject: the weather will be fine today
h: NS: CPM <urn:oma:params:cpm>
h: Require: My Features.VitalMessageOption
h: CPM.Conversation-ID: 123jk8z
s:
e: Content-type:text/xml:charset=utf-8

A configuration of a messaging system according to an embodiment of the present invention is described as follows with reference to FIG. 1.

FIG. 1 illustrates a system configuration in an SIP-based service environment according to an embodiment of the present invention. Devices constituting this system are not necessarily physically distinguished, but can be logically distinguished according to their unique functions. For example, a Participating Function (PF) and a Controlling Function (CF) may be realized as physically different devices, and may also be realized within a single messaging server.

Referring to FIG. 1, a SIP-based messaging system includes a messaging client 10, a PF 13, a CF 12, and a message storage server 11. A SIP/IP core network 14 serves as a base network in which the messaging system operates. In addition, a variety of devices such as an Interworking Function and an Interworking Selection Function may be included depending on types of messaging services. However, a detailed description of these functions is not required to describe the present invention, and therefore, detailed descriptions of these devices will be omitted for clarity and conciseness.

The client 10 corresponds to a subscriber of a pertinent messaging service. The messaging client 10 generates a message, transmits the generated message to another messaging client, and receives a message transmitted by another messaging client.

The client 10 may include an interface and a controller. The interface transmits and receives messages, and exchanges media through multimedia sessions. The controller generates a message including information corresponding to a conversation storage request and transmits the generated message the conversation store request information to the PF 13, upon receiving a request to store at least one media from a multimedia session after the session for multimedia is established between the client 10 and another client. After establishing a session with the PF that stores media corresponding to the conversation store request information, the controller releases the established session to another client.

The PF 13, which is a messaging server, receives a message and a service control signal, for example, a session establishment request, from the messaging client 10, and delivers the received message to a receiving client or another messaging device. In particular, the PF 13 stores the received message in the message storage server 11 if storage of the received message has already been set or is requested. In addition, if storage of a session or particular media in the session is set or requested, the PF 13 participates in the session to store all media transmitted through the session or only some specific designated media from amongst all of the media transmitted through the session in the message storage server 11.

The PF 13 may include an interface and a controller. An interface of the PF 13 is adapted to transmit and receive messages to/from first and second clients. A controller of the PF 13 is adapted to, upon receiving a message from the first client, determine whether conversation store request information is included in the received message, transmit a session establishment request message to each of the first and second clients when the conversation store request information is included in the received message, and store media corresponding to the conversation store request information from among the media transmitted through the established sessions, when a session for each of the first and second clients is established. Any one of the session establishment request messages may be a session establishment request message for replacing the ongoing session between the first and second clients with a new session with the PF.

The CF 12 is a messaging server, which performs a function of a conference server that generates and maintains a conference session. The term "conference session" as used herein refers to a session with three or more participants, which is designed such that a message or media transmitted by any one participant of the conference session may be delivered to the other participants of the conference session.

The message storage server 11, which includes space for storing messages and media exchanged between users, manages and maintains stored messages, as well as performs various functions such as message deletion/moving and folder generation/deletion/moving according to a request signal received from the user or the PF 13.

The SIP/IP core network 14 delivers control signals corresponding to SIP-based services and messages generated by the associated clients or service devices, to other messaging clients or service devices.

A process of storing conversation upon a user's request in the above system is described as follows.

First, in the CPM service, a user stores a user preference written in the Extensible Mark-up Language (XML) in an XML Document Management Server (XDMS) to receive his/her own specialized service. Upon receiving a message and a session establishment request, the PF 13 checks the user preference stored in the user's XDMS to determine whether to store a conversation. In the present invention, a method for storing or not storing a conversation upon a user's direct request is described, rather than a method for storing or not storing a conversation based on a user preference pre-stored in the XDMS.

This user preference is referred to as a dynamic user preference according to embodiments of the present invention. The dynamic user preference is defined in order to request storage or non-storage of a conversation. Control of a conversation storage function using the dynamic user preference is described as follows.

Unlike the common user preference the PF 13 receives via the XDMS, the dynamic user preference is a user preference that the PF 13 directly receives from the client 10. As to the difference between the dynamic user preference and the general user preference, while the same user settings are always applied to the user preference unless the user changes the settings stored in the XDMS, the dynamic user preference is temporarily applied only to one relevant message. Thus, setting collisions may occur between the XDMS user preference and the dynamic user preference. In this case, the PF 13 first applies the dynamic user preference to the part associated with conversation storage, and then the PF 13 applies the XDMS user preference to only the other parts.

Elements included in the dynamic user preference associated with conversation storage and the contents represented by each of the elements are described in Table 3. In actual service realization, names of these elements and ways to represent user settings in the elements can be appropriately changed, and some elements may be defined as attributes of other elements in accordance with embodiments of the present invention.

TABLE 3

| Element | Contents |
| --- | --- |
| <store> | Represents whether to store conversation. (e.g., true or false) |
| <parent> | Used when a user wants to store the conversation as a part of stored another conversation history in an integrated manner, and represents a parent conversation ID for integration. |
| <target> | Represents a conversation ID to be stored. That is, it represents a Conversation-ID header value of CPIM content attached to MESSAGE or INVITE. |
| <contribution> | Used to store MESSAGE, and represents a contribution-ID of MESSAGE to be stored. |
| <session> | Used to request to store conversation in the large message mode and the session mode, and represents a session-ID of the relevant session. Herein, the session-ID refers to an identifier in a broad meaning, enabling unique recognition of the session. Examples of the session-ID may include a dialog ID and a conference URI |
| <target media> | Used to request to store conversation in the session mode, and represents a type of the media to be stored when some media included in a multimedia session are wanted to be stored. It can have one or more media types locatable in an "m=" line of SDP as an element value. |

The dynamic user preference is an XML document including the elements described in Table 3, and can be written in many different formats.

An example of a dynamic user preference created using the elements defined in Table 3 is as shown in Table 4, in which a Multipurpose Internet Mail Extensions (MIME) type of the dynamic user preference is defined as "message/dynamic-preference+xml." A value of the MIME type may be changed to any other value in the actual service environment.

TABLE 4

Content-type: message/dynamic-preference+xml
Content-length: ...
<?xml version="1.0" encoding="UTF-8"?>
<dynamic-preference xmlns="urn:oma:xml:cpm:dynamic-preference>
   <target> tj233z </target>
   <contribution> 9d8zue </contribution>
   <store> true </store>

Meanwhile, the dynamic user preference allows the user to directly request storage of a conversation or to stop the storage in real time. This dynamic user preference is attached to a pager mode message during transmission of the message.

Since the message transmitted in the pager mode is always delivered to the recipient via the PF 13, the user attaches the dynamic user preference to the pager mode message during transmission of the message. As stated above, the dynamic user preference is temporarily applied to only one associated message. Therefore, if a user of a sending device that is transmitting multiple messages wants to store all the messages as a conversation history, a sending client should attach the dynamic user preference to each of the pager mode messages during transmission. Herein, the sending PF 13 first applies the dynamic user preference when a collision occurs between contents set in the dynamic user preference and the general user preference.

To store a pager mode message in the message storage server 11 as a conversation, the sending client 10 attaches a dynamic user preference set to store conversation to the message's body part, during transmission of the pager mode message.

If the PF 13 receives a pager mode message and a session establishment request including the same conversation ID while a setting of the dynamic user preference received through a previous pager mode message is valid, then the PF 13 stores as the pager mode message within the same conversation according to the previous setting of the dynamic user preference, even though the pager mode message and the session establishment request do not include the dynamic user preference. The duration of the validity of the setting of the dynamic user preference may vary depending on the service policy in service implementation.

Figure 2:
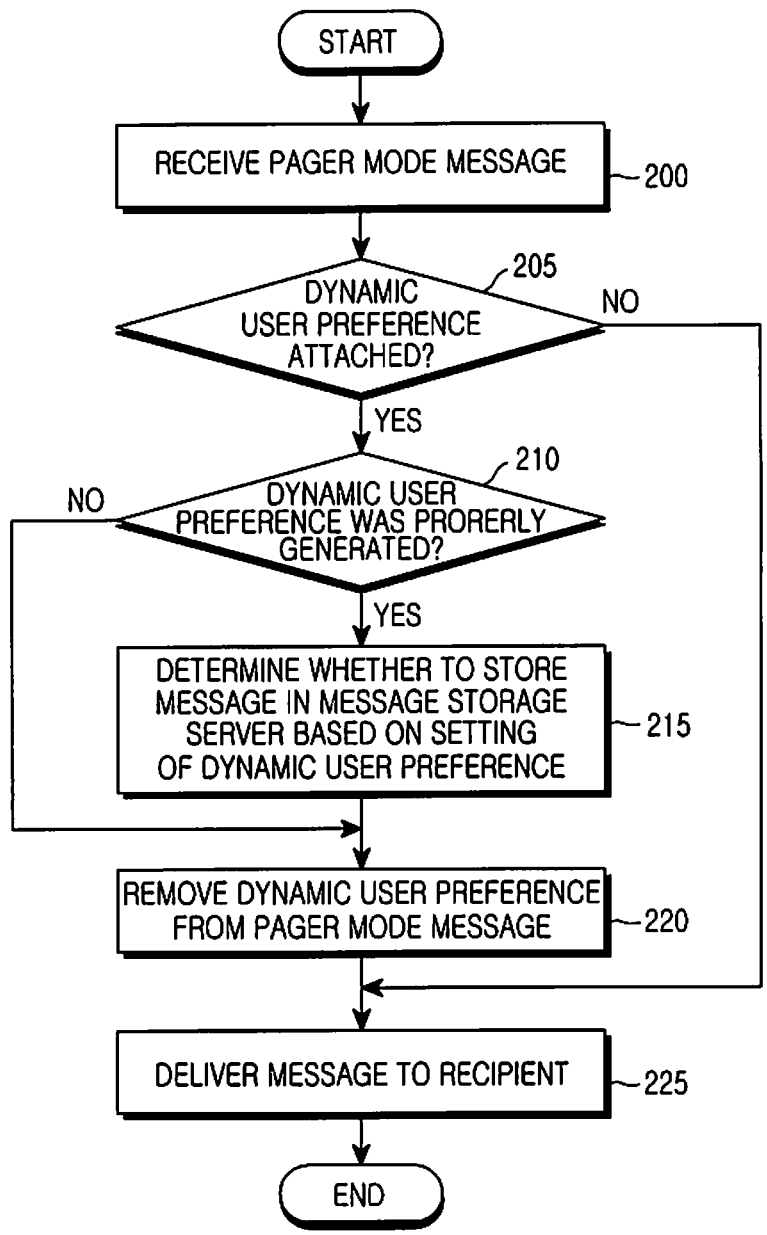
FIG. 2 is a flowchart illustrating an operation of a sending PF upon receiving a pager mode message according to an embodiment of the present invention.

An operation algorithm of a sending PF for storing a conversation upon receiving a pager mode message is illustrated in FIG. 2.

Referring to FIG. 2, the sending PF 13 receives a pager mode message in step 200, and determines whether the pager mode message includes a dynamic user preference in step 205. If a dynamic user preference is not included, the sending PF 13 proceeds to step 225, and otherwise, proceeds to step 210.

In step 210, the sending PF 13 determines whether the dynamic user preference was properly generated according a predetermined format, by determining whether a <conversation> element value of the dynamic user preference is identical to the message's conversation ID and a <contribution> element value is identical to the message's contribution ID. If both of the respective element values are identical to the corresponding message IDs, the sending PF 13 determines that the dynamic user preference has been duly written and proceeds to step 215. If any one of the two element values is not identical to its corresponding message ID, the sending PF 13 determines that the dynamic user preference has not been duly written and proceeds to step 220.

In step 215, the sending PF 13 determines whether to store the message in the message storage server 11 depending on the setting of the dynamic user preference, and based upon the setting, stores the message as a conversation history if the sending PF 13 determines to store the message. If the dynamic user preference collides with the XDMS user preference, the sending PF 13 performs the conversation storage operation depending on the setting of the dynamic user preference. The XDMS user preference is applied intact to the parts other than the conversation storage-related part.

The sending PF 13 removes the dynamic user preference from the received pager mode message in step 220, and then transmits the user preference-removed pager mode message to the recipient in step 225.

Figure 3:
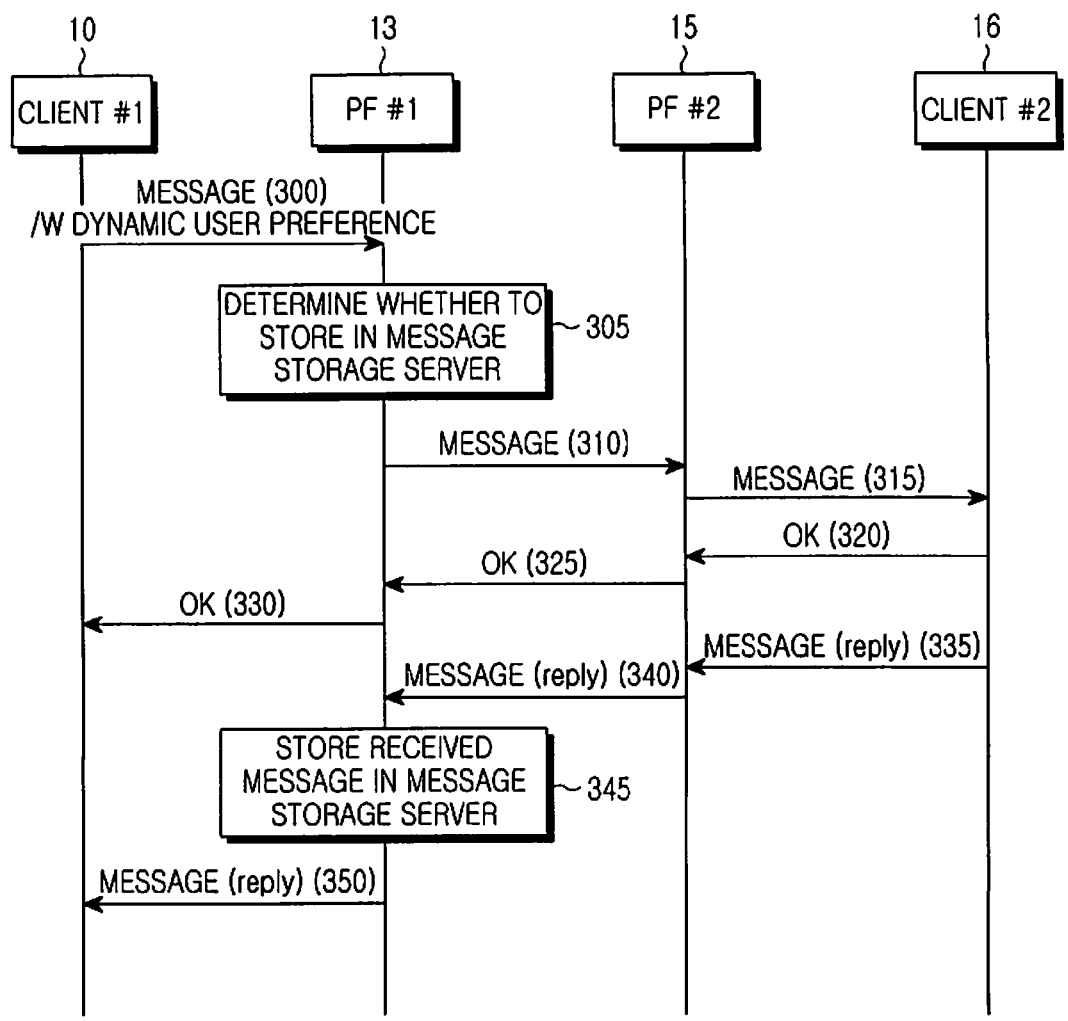
FIG. 3 is a flow diagram illustrating a process of delivering a pager mode message based on the operation of the PF in FIG. 2.

Reference will be made to FIG. 3 to describe a process of delivering a pager mode message based on the operation of the PF in FIG. 2. FIG. 3 shows a process in which a pager mode message including a dynamic user preference set to store conversation is delivered from a sender to a recipient.

Referring to FIG. 3, a first client 10 transmits a pager mode message (MESSAGE) including a dynamic user preference to a first PF 13 in step 300.

Upon receiving the pager mode message, the first PF 13 operates according to the operation algorithm described with reference to FIG. 2, in step 305. In other words, the first PF 13 determines whether to store the message in the message storage server 11 according to the setting of the dynamic user preference, and based upon the determination, stores the message if the PF 13 determines to store the message. In step 310, the first PF 13 transmits the pager mode message with the dynamic user preference removed, to a second PF 15. In step 315, the second PF 15 transmits the received pager mode message to a second client 16.

In steps 320 to 330, the second client 16 returns an OK response message indicating a successful receipt of the message. The OK response message is delivered to the first client 10 along the inverse of the path of the message received in step 315.

In steps 335 and 340, the second client 16 transmits a pager mode message to the first client 10 in the Reply form for the received message. The message created in the Reply form has the same conversation ID as that the conversation ID of the received message. This message is delivered to the first PF 13 via the second PF 15.

In step 345, the first PF 13 stores the message in the message storage server 11 within the same conversation history as the conversation history of the previous message, according to the determination that a conversation ID included in the received message is identical to the conversation ID of the message stored in step 305.

In step 350, the first PF 13 transmits the received message to the first client 10.

Meanwhile, conversation storage or stoppage of the conversation storage may be requested even in the large message mode or the session mode. In this case, unlike in the pager mode, a session should be established with the recipient in advance, in order to transmit content in the large message mode or the session mode. In this specific case, a sending client should transmit a session establishment request (INVITE), and the sending client may deliver conversation storage-related user settings to the PF 13 by attaching a dynamic user preference to the INVITE.

An example of the dynamic user preference attached to the session establishment request is described as follows with reference to Table 5.

TABLE 5

Content-type: message/dynamic-preference+xml
Content-length: ...
<?xml version="1.0" encoding="UTF-8"?>
<dynamic-preference xmlns="urn:oma:xml:cpm:dynamic-preference>
    <target> tj233z </target>
    <session> cn14t0z </session>
    <target media> audio </target media>
    <store> true </store>

Referring to Table 5, the dynamic user preference is set such that a conversation ID is "tj233z", a session ID of a session to be stored is "cn14t0z", and only "audio" is stored from this session.

Figure 4:
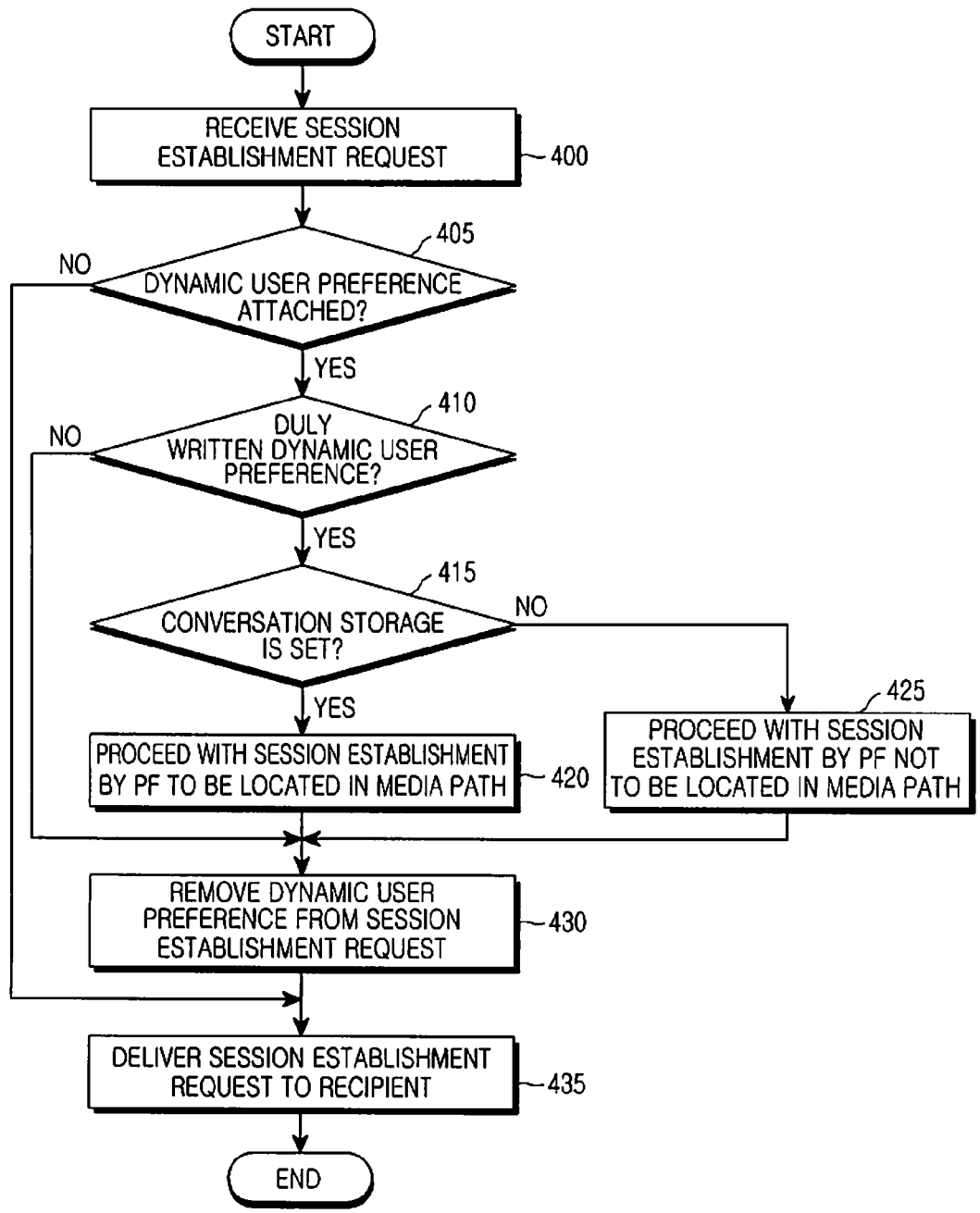
FIG. 4 is a flowchart illustrating an operation of a sending PF upon receiving a session establishment request according to an embodiment of the present invention.

An operation algorithm for a sending PF upon receiving the session establishment request is illustrated in FIG. 4.

Referring to FIG. 4, Steps 400, 405, 430, and 435 in FIG. 4 are similar to steps 200, 205, 220, and 225 in the operation of processing the pager mode message, which was described in FIG. 2, and therefore, a description thereof will be omitted for clarity and conciseness.

In step 410, the PF 13 determines whether the dynamic user preference has been duly written, by determining whether a <target> element of the dynamic user preference is identical to a conversation ID represented in the session establishment request and a <session> element is identical to a session ID in a broad meaning, included in the session establishment request. In addition, if <target media> is included, the PF 13 should also determine whether a media type represented by this value is described in a Session Description Protocol (SDP) body part of the session establishment request. If all of the <target> element, the <session element> and the <target media> elements are identical to their respective associated information included in the session establishment request, the PF 13 determines that the dynamic user preference has been duly written and proceeds to step 415. Otherwise, the PF 13 proceeds to step 430.

In step 415, the PF 13 determines whether conversation storage is set in the dynamic user preference. If the conversation storage is set, the PF 13 proceeds to step 420, and otherwise, proceeds to step 425.

In step 420, the PF 13 establishes a session so that the PF 13 is located in a media path, since the PF 13 should be located in the media path to store media. More specifically, the PF 13 should establish sessions for sending information to and receiving information from clients and link the two established sessions, to serve as a media intermediary between both clients. For this operation, the PF 13 should serve as a Back-to-Back User Agent (B2BUA).

In step 425, the PF 13 establishes a direct session between the sending and receiving clients, since the PF 13 does not need to be located in the media path.

Figure 5:
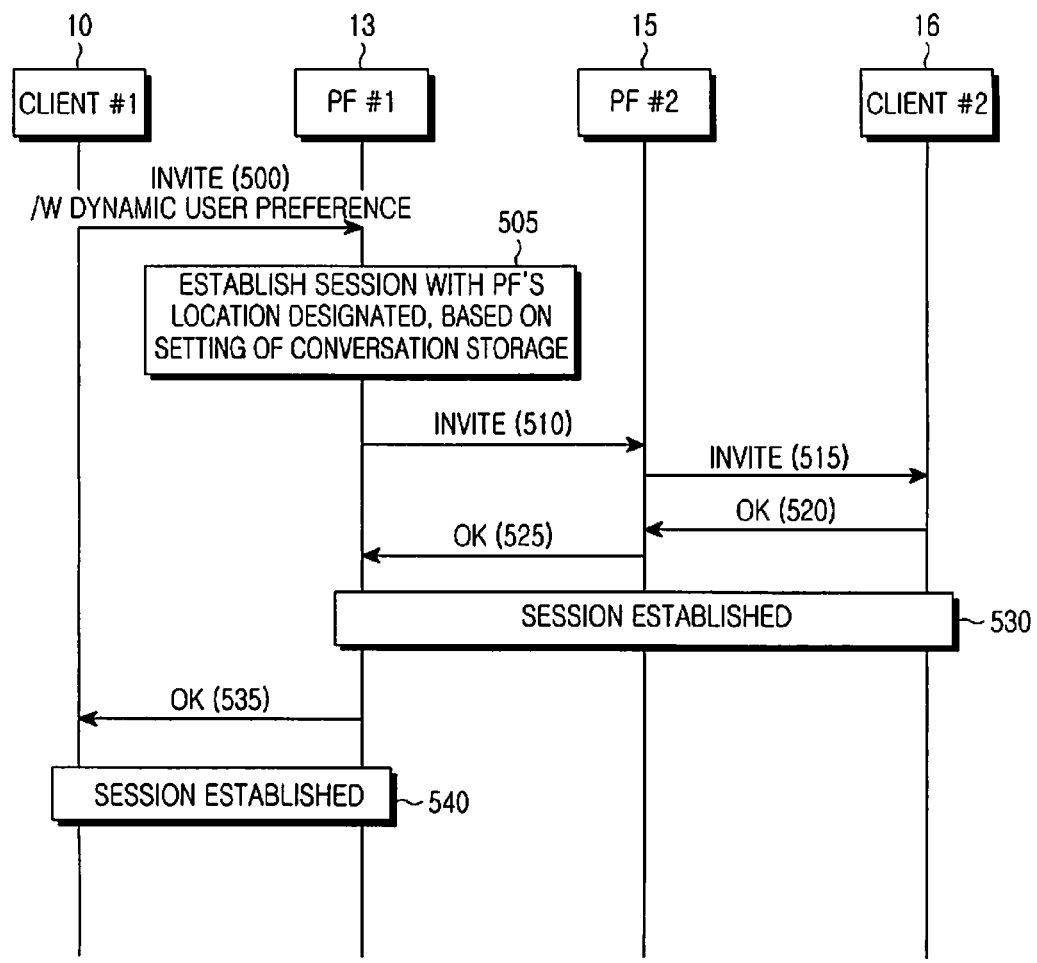
FIG. 5 is a flow diagram illustrating a session establishment process for large message mode and session mode based messaging according to an embodiment of the present invention.

FIG. 5 illustrates a process in which a session is created upon receiving a session establishment request including a dynamic user preference set to store a conversation during session establishment for messaging based on the large message mode and messaging based on the session mode.

Referring to FIG. 5, the first client 10 attaches a dynamic user preference set to store a conversation to a session establishment request (INVITE) and transmits the INVITE to the first PF 13 in step 500.

In step 505, the first PF 13 performs the operation algorithm described with reference to FIG. 4. More specifically, the first PF 13 establishes a session with the location of the PF designated according to the conversation storage settings. In particular, to store conversation based on the dynamic user preference, the first PF 13 should establish sessions with the first and second clients 10 and 16, respectively.

In step 510, to establish a session to the second client 16, the first PF 13 enters the address of the first PF 13 in a Contact header of a session establishment request, sets connection information of an SDP body as an IP address of the first PF 13, and then transmits the session establishment request to the second PF 15.

In step 515, the second PF 15 transmits the received session establishment request to the second client 16.

If the second client 16 transmits an OK response message to the second PF 15 as a sign of acceptance for the session establishment request in step 520, the second PF 15 transmits the received OK response message to the first PF 13 in step 525.

In step 530, upon receiving the OK response message, the first PF 13 establishes a session to the second client 16. The session is established to include all media accepted by the second client 16 among the media requested by the first PF 13.

In step 535, the first PF 13 transmits an OK response message to the first client 10. At this point, the first PF 13 enters the address of the PF 13 in a Contact header of the OK response message and sets connection information of an SDP body as the IP address of the PF 13.

In step 540, upon receiving the OK response message, the first client 10 establishes a session with the first PF 13. The session is established to include all media accepted by the first PF 13 among the media requested by the first PF 13.

As described above, the first PF 13 establishes sessions with the first and second clients 10 and 16, respectively, and mediates these sessions, enabling transmission/reception of media between the first and second clients 10 and 16. As the first PF 13 receives media transmitted between the first and second clients 10 and 16, the first PF 13 stores all media or designated media in the message storage server 11 as a conversation history according to the dynamic user preference settings.

Although, in the preceding described examples, conversations are stored or storage ceases during session establishment, according to embodiments of the present invention, other cases may be considered in which a conversation is stored or storage ceases during the ongoing session. An operation of turning on/off the conversation storage function during the ongoing session is required only in the session mode. A method that allows the PF to store or cease storing a conversation upon a user's request even in the situation where the conversation is stored or not stored according to the XDMS user preference settings is described herein.

First, a method for ending conversation storage upon a user's request in the situation where the current ongoing session is stored as a conversation as the dynamic user preference is set in the XDMS user preference to store the conversation is described as follows.

In this case, the sending client 10 transmits a dynamic user preference that is set not to store conversation, to the sending PF 13. An SIP message used to transmit the dynamic user preference may be a MESSAGE or a PUBLISH message. When PUBLISH is used, an Event header value will be set as "dynamic-preference" in the present invention. This header value may be changed to other values appropriate to the actual service environment. If the dynamic user preference is included in MESSAGE, the above-described pager mode message method is used without the user content.

Upon receiving a MESSAGE or a PUBLISH message including the dynamic user preference that is set not to store conversation, the sending PF 13 stops the operation of storing the session as conversation according to the setting of the dynamic user preference.

In contrast, a method for requesting a conversation storage upon a user's request in the situation where the current ongoing session is not stored as conversation as the dynamic user preference is set in the XDMS user preference not to store the conversation is described as follows.

During session establishment, since the sending PF 13 determines not to store the conversation upon checking the XDMS user preference, a session is directly established between the sending client 10 and the receiving client 16. The sending client 10 is in a situation where the sending client 10 cannot receive the media transmitted through the session. Thus, if the sending PF 13 receives the dynamic user preference set to store a conversation through a MESSAGE or PUBLISH message during the session in progress, the sending PF 13 should change characteristics of the ongoing session to enable participation in the ongoing session and receive media.

Meanwhile, two methods in which the sending PF 13 changes the ongoing session to receive media are described as follows.

A first method allows the PF to establish sessions to the sending client 10 and the receiving client 16, respectively, and mediate theses sessions, instead of the session established between the clients 10 and 16.

A second method extends a 1:1 session established between the sending client 10 and the receiving client 16 as a conference, and allows the PF to participate in the extended conference.

Figure 6:
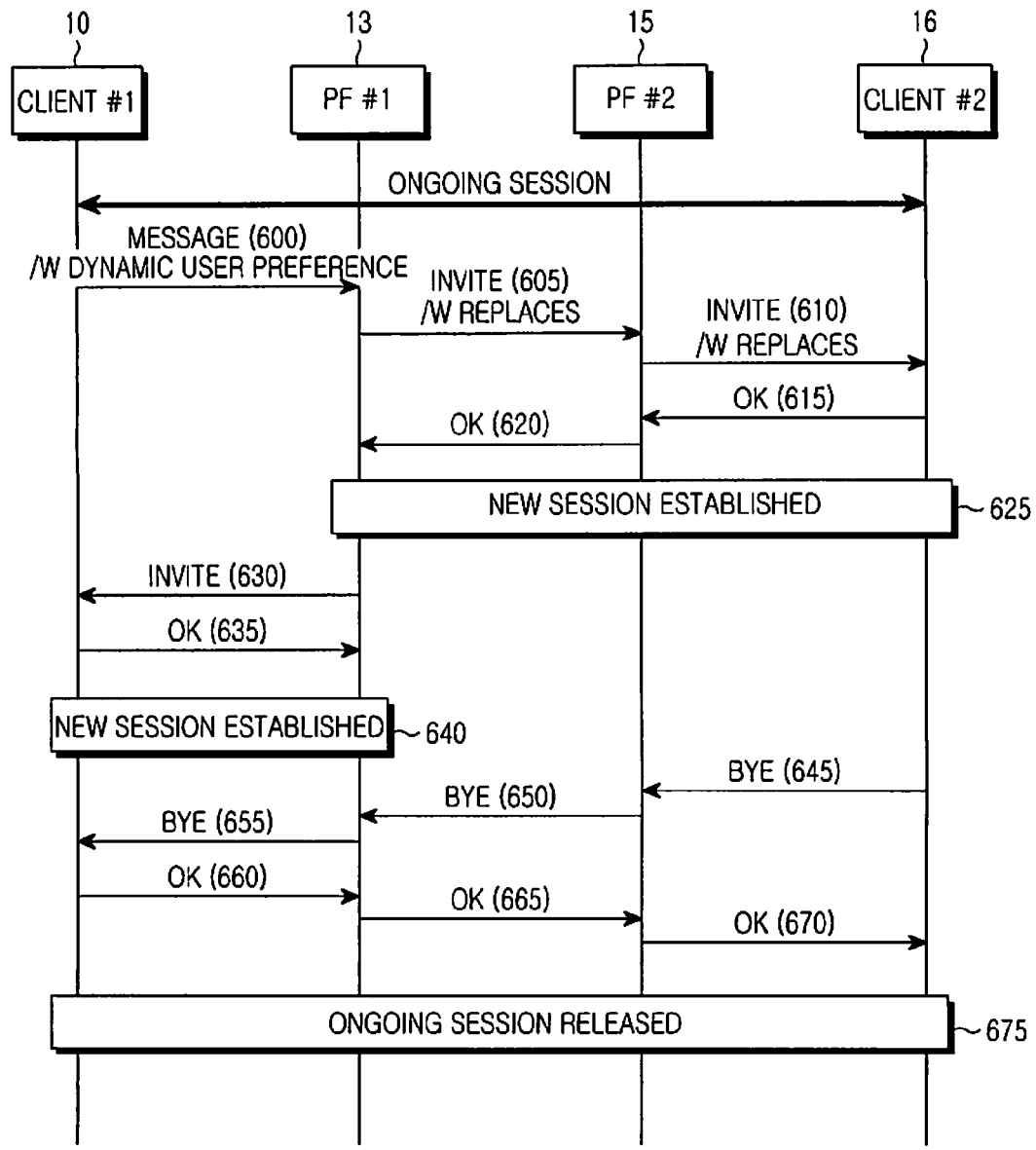
FIG. 6 is a flow diagram illustrating a process of switching a PF to a state where media reception is possible, according to an embodiment of the present invention.

FIG. 6 illustrates an example of a process for switching a PF to a state where media reception is possible using the first method. In this example according to FIG. 6, the first and second clients 10 and 16 exchange media through a session directly established between the two clients, and it is assumed that the PF does not store the session as a conversation.

Referring to FIG. 6, the first client 10 attaches a dynamic user preference set to store a conversation to a MESSAGE format, and transmits the MESSAGE to the first PF 13 in step 600. As described above, the dynamic user preference may be attached to a PUBLISH message for delivery of the dynamic user preference.

In step 605, the first PF 13 determines whether the dynamic user preference is attached to the received MESSAGE and the attached dynamic user preference has been duly written, and transmits a session establishment request (INVITE) having the second client 16 as a reception address (or recipient address) if the attached dynamic user preference has been duly written. A SIP address of the first PF 13 is entered in a Contact header of the session establishment request, a dialog ID of the ongoing session is entered in a Replaces header, and media-related information of an SDP body is set the same as that of the ongoing session. However, an IP address of the first PF 13 is entered in an SDP parameter as connection information. The address of the first PF 13 is entered into the Contact header and the connection information to establish a new session between the first PF 13 and the second client 16. The Replaces header is included in the session establishment request, in order to replace the ongoing session with a new session by ending the ongoing session after establishing the new session.

If the second PF 15 transmits the received session establishment request to the second client 16 in step 610, the second client 16 transmits an OK response message to the second PF 15 in order to indicate acceptance of the session establishment request in step 615.

The second PF 15 transmits the received OK response message to the first PF 13 in step 620, and a new session is established between the first PF 13 and the second client 16 in step 625.

In step 630, the first PF 13 transmits a session establishment request to the first client 10. At this point, the first PF 13 enters the SIP address and IP address of the PF 13 in the session establishment request's Contact header and the SDP body's 'connection' parameter, respectively. Media-related information of the SDP body is entered in the same manner as in the ongoing session.

The first client 10 transmits an OK response message to the first PF 13 as a sign of acceptance for the received session establishment request in step 635, and a new session is established between the first client 10 and the first PF 13 in step 640.

In steps 645 to 655, the second client 16 transmits a session end request (BYE) for the ongoing session to the first client 10 based on the Replaces header of the session establishment request received in step 610. The session end request is transmitted to the first client 10 via the second PF 15 and the first PF 13. Although, according to FIG. 6, the second PF 15 transmits the session end request after a session is established between the first client 10 and the first PF 13, in order to clearly show each message transmission step, the session end request only needs to be transmitted after the new session is established in step 625, i.e., the session end request proceeds regardless of the operation and time in which a session is established between the first PF 13 and the first client 10.

In steps 660 to 670, the first client 10 transmits an OK response message to the second client 16 as a sign of acceptance of the received session end request. The OK response message is transmitted to the second client 16 via the first PF 13 and the second PF 15.

In step 675, the ongoing session between the first and second clients 10 and 16 ends.

In summary, the first PF 13 establishes sessions with the first and second clients 10 and 16, respectively, and mediates these sessions. Since the media is delivered through the session between the first and second clients 10 and 16 passing through the first PF 13, the first PF 13 may store all media corresponding to these sessions or only designated media in the message storage server 11 according to the dynamic user preference settings.

As an alternative process, in step 605, the first PF 13 may first transmit the session establishment request including a Replaces header to the first client 10, and transmit a common session establishment request to the second client 16 after a session is successfully established in reply to the session establishment request. In this case, a session end request (BYE) for the ongoing session is transmitted from the first client 10 to the second client 16. This alternative process can be easily understood based on the description former process according to FIG. 6. As a result, the message flow of the alternative process is similar to that of the former case, so a detailed description thereof will not be provided separately for clarity and conciseness.

Figure 7:
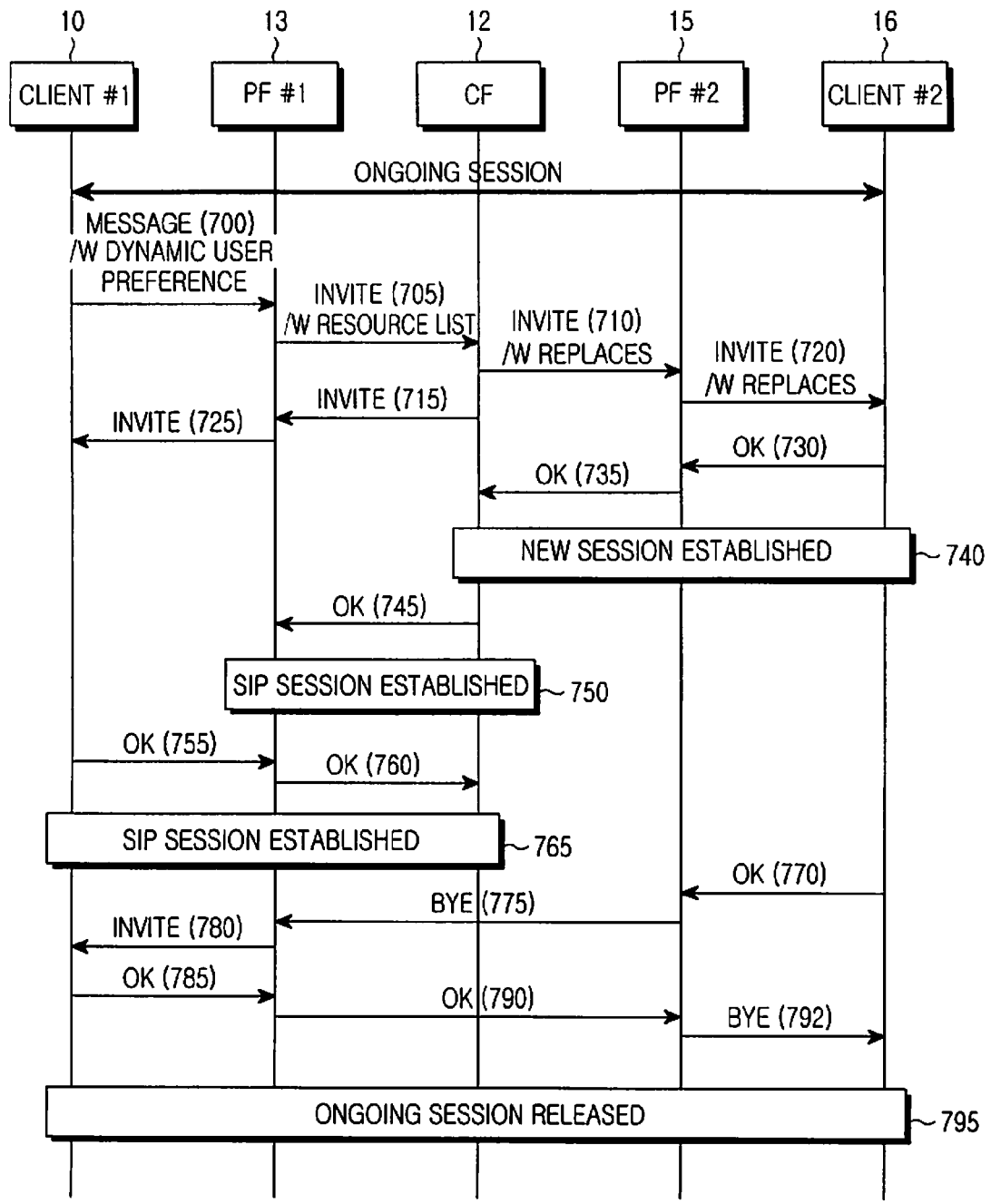
FIG. 7 is a flow diagram illustrating a method for enabling a PF to receive media transmitted between first and second clients according to an embodiment of the present invention.

FIG. 7 is a message flow diagram illustrating a method for enabling the first PF 13 to receive media transmitted between the first and second clients 10 and 16 in a different manner than the processes described with reference to FIG. 6. The first PF 13 performs an operation of changing a 1:1 session between the first and second clients 10 and 16 to a conference, and then participating in the conference in order to receive media of the ongoing session. A detailed description of this operation is provided as follows, with reference to FIG. 7.

Referring to FIG. 7, the first client 10 attaches a dynamic user preference set to store conversation to a MESSAGE, and transmits the MESSAGE—to the first PF 13 in step 700. As described before, the dynamic user preference may be attached to a PUBLISH message for delivery.

In step 705, the first PF 13 transmits a session establishment request with a resource list included in its body part to the CF 12, in order to create a conference and invite the first and second clients 10 and 16 to the conference. The resource list includes recorded addresses of multiple recipients and is used to simultaneously transmit messages to the multiple recipients or to invite the multiple recipients to the session. Hence, the resource list in the session establishment request transmitted to the CF 12 has addresses of the first and second clients 10 and 16 recorded as shown in Table 6 below.

TABLE 6

```
<resource-lists>
    <list>
        <entry uri=client_1@domain.ocm/>
        <entry uri=client_2@domain.com?Replaces=dialog ID of
ongoing session/>
    </list>
</resource-lists>
```

In Table 6, the address of the second client 16 is associated using a Replaces parameter having a dialog ID of the ongoing session as its value and a "?" mechanism. The "?" mechanism allows associated parameter information, i.e., "Replaces," to be included in the session establishment request transmitted to 10 the second client 16.

In steps 710 and 715, the CF 12 transmits session establishment requests to the addresses recorded in the resource list of the received session establishment request, i.e., to the first and second clients 10 and 16, respectively. The session establishment request may be transmitted to the first and second clients 10 and 16 in any order. However, as recorded in the resource list of Table 6, the Replaces header is entered in the session establishment request to be transmitted to the second client 16. The CF 12 enters an address of the established conference in the Contact headers of the respective session establishment requests during transmission.

In steps 720 and 725, the first and second PFs 13 and 15 transmit the received session establishment requests to the first and second clients 10 and 16, respectively.

In steps 730 and 735, the second client 16 transmits an OK response message to the CF 12 to indicate acceptance of the session establishment request. The OK response message is delivered via the second PF 15.

In step 740, a session is established between the CF 12 and the second client 16, and the second PF 15 participates in the conference.

In step 745, upon receiving an OK response message from at least one of the first and second clients 10 and 16, the CF 12 transmits an OK response message for a conference establishment request to the first PF 13, which has requested the conference establishment.

In step 750, a session is established between the first PF 13 and the CF 12, and the first PF 13 participates in the conference.

In steps 755 and 760, the first client 10 transmits an OK response message to the CF 12 to indicate acceptance of the received session establishment request. The OK response message is delivered via the first PF 13.

In step 765, a session is established between the first client 10 and the CF 12, and the first client 10 participates in the conference.

In steps 770 to 780, the second client 16 transmits a request to end the ongoing session to the first client 10 based on the Replaces header included in the received session establishment request. The session end request is delivered via the second PF 15 and the first PF 13.

In steps 785 to 792, the first client 10 transmits an OK response to the second client 16 to indicate acceptance of the session end request. The OK response message is delivered via the first and second PFs 13 and 15.

In step 795, the session in progress between the first and second clients 10 and 16 ends.

As an alternative, in step 705, when transmitting the session establishment request for a conference to the CF 12, the first PF 13 may attach a Replaces header to the address of the first client 10 instead of the address of the second client 16 using the "?" mechanism. In this case, a session end request for the ongoing session is transmitted from the first client 10 to the second client 16 after a new session is established between the first client 10 and the CF 12. Regarding this alternative case, its corresponding process can be easily understood from the description of the former case with reference to FIG. 7. As a 15 result, the message flow of the alternative case is similar to the message flow of the former case, so a detailed description of the alternative case will not be provided separately for clarity and conciseness.

Meanwhile, a Uniform Resource Identifier (URI) parameter may be used to request storage of a conversation and stop the storage of the conversation. A method for allowing the PF to request storage of conversation and stop the storage of the conversation using the URI parameter is described as follows.

A request to store a conversation and stop the storage of the conversation is represented in the URI parameter. Table 7 below specifies an example of parameters defined according to an embodiment of the present invention for this purpose.

TABLE 7

| URI parameter | Contents |
|---|---|
| Store | Represents whether to store conversation. (e.g., true or false) |
| Parent | Used when a user wants to store the conversation as a part of stored another conversation history in an integrated manner, and represents a parent conversation ID for integration. |
| target-media | Used to request to store conversation in the session mode, and represents a type of the media to be stored when some media included in a multimedia session are wanted to be stored. It can have one or more media types locatable in an "m=" line of SDP as an element value. |

A process in which a conversation corresponding to a pager mode message is stored according to the URI parameter is described herein below. The pager mode message is always delivered to a recipient via the PF. Thus, if the sending client simply includes an instruction to store the message in the pager mode message, the PF may store the message in the message storage server before sending the instruction to the sender.

Figure 8:
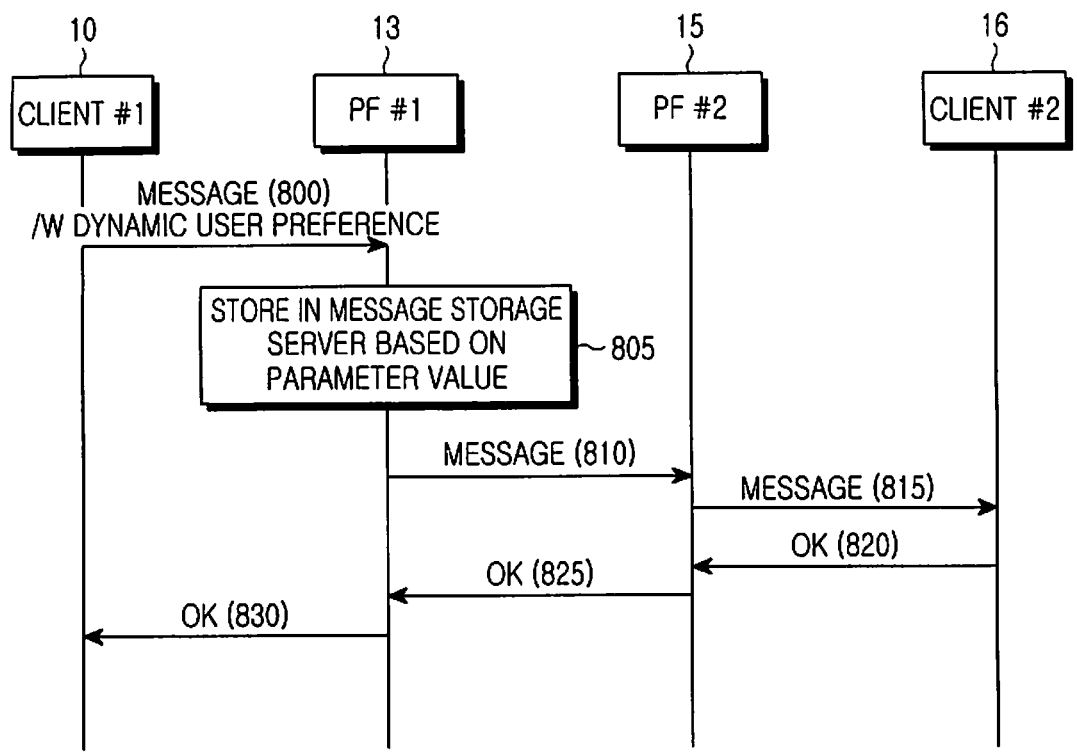
FIG. 8 is a flow diagram illustrating a process of delivering a pager mode message including a URI parameter via a PF as a message messenger according to an embodiment of the present invention.

FIG. 8 illustrates a process in which a pager mode message with a URI parameter is delivered from a sender to a recipient via a PF as a message messenger.

Referring to FIG. 8, the first client 10 transmits, to the first PF 13, a pager mode message including a Request-URI parameter that is set to allow the first PF 13 to store the message in step 800. A Request-line of the transmitted pager mode message is written in the form shown in Table 8.

TABLE 8

MESSAGE sip: recipient_client@domain.com;store=true SIP/2.0
From <sip:sending_client@domain.com>;tag=xxx
To: <sip:recipient_client@domain.com>
...

As shown in Table 8, a 'store' parameter is inserted in the Request-URI along with an address of the second client, and the parameter value is set as "true." If the user does not want the pager mode message to be stored, the parameter of table 7 is not added to the Request-URI, and only a reception address is inserted in the Request-URI according to conventional methods.

In step 805, the first PF 13 stores the message in the message storage server 11 of the first client 10, determining that the 'store' parameter is set as "true" in the Request-URI part of the received message.

In steps 810 and 815, the first PF 13 transmits the received message to the recipient's address. Before transmitting the message, the first PF 13 deletes the URI parameter from the Request-URI. This message is transmitted to the second client 16 via the second PF 15.

In steps 820 to 830, the second client 16 transmits an OK response message indicating reception of the message to the sending client 10. This message is transmitted to the first client 10 via the second PF 15 and the first PF 13. As mentioned above, the PFs serve as message messengers.

By contrast, a process in which a PF is set as a message recipient is described as follows with reference to FIG. 9. In this method, a PF, which is regarded as a message recipient and has received a message, is allowed to store the received message in a user's message storage server. As mentioned above, in addition to the receiving client, the PF is also a message recipient, and therefore, the sending client transmits a message to both the receiving client and the PF.

Figure 9:
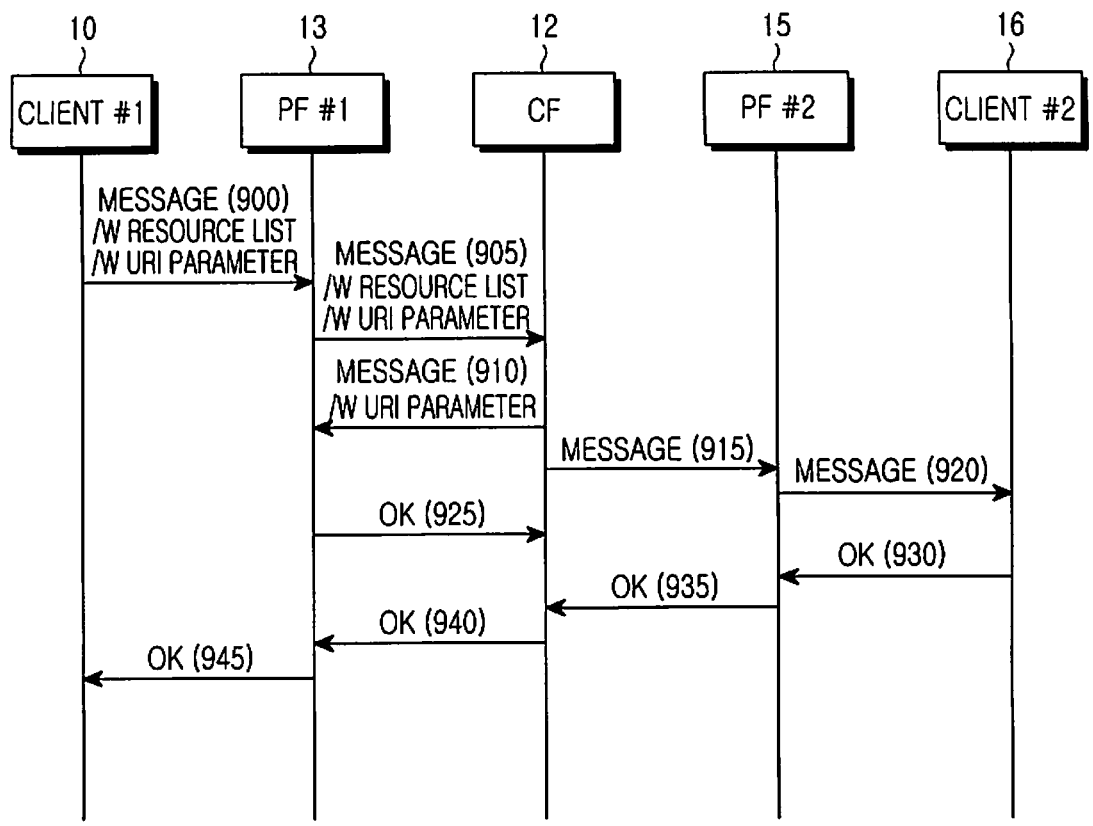
FIG. 9 is a flow diagram illustrating a process of delivering a pager mode message including a URI parameter via a PF as a message recipient according to an embodiment of the present invention.

FIG. 9 illustrates a process in which a PF is set as a message recipient and a pager mode message with the URI parameter is delivered from the sender to the recipient. The message delivery process is as follows.

Referring to FIG. 9, the first client 10 generates a pager mode message with the first PF 13 and the second client 16 designated as recipients. The first client 10 transmits the pager mode message to an address of the CF 12 in step 900. To this end, Request-URI of the message is entered as an address of the CF 12 and a resource list with addresses of the first PF 13 and the second client 16 recorded therein is attached to a body part of the message. However, when the address of the first PF 13 is entered in the resource list, the 'store' parameter is must be attached to the address of the first PF 13 in order to allow the first PF 13 to store the received message. A value of the 'store' parameter is set as "true." Other parameters, may be used according to their respective purposes, when necessary.

In step 905, the first PF 13 transmits the received message to the CF 12. In steps 910 and 915, the CF 12 transmits pager mode messages to the addresses recorded in the resource list of the received message, i.e., to the address of the first PF 13 and the second client 16. Since the address of the first PF 13 in the resource list is combined with a URI parameter, the CF 12 also enters the URI parameter, when entering the address of the first PF 13 in the Request-URI of the message transmitted to the first PF 13.

The second PF 15 transmits the received message to the second client 16 in step 920, and the first PF 13 transmits an OK response message indicating successful receipt of the message to the CF 12 in step 925.

In steps 930 and 935, the second client 16 transmits an OK response message indicating successful receipt of the message to the CF 12. The OK response message is delivered via the second PF 15.

In steps 940 and 945, the CF 12 transmits, to an address of the first client 10, an OK response message indicating that the message received from the first client 10 has been successfully delivered to the recipient's address. The OK response message is delivered via the first PF 13.

Meanwhile, a process regarding a case in which conversation storage is requested upon a session establishment request according to the URI parameter is described as follows with reference to FIG. 10. In this case, the PF serves as a messenger of the session establishment request.

Figure 10:
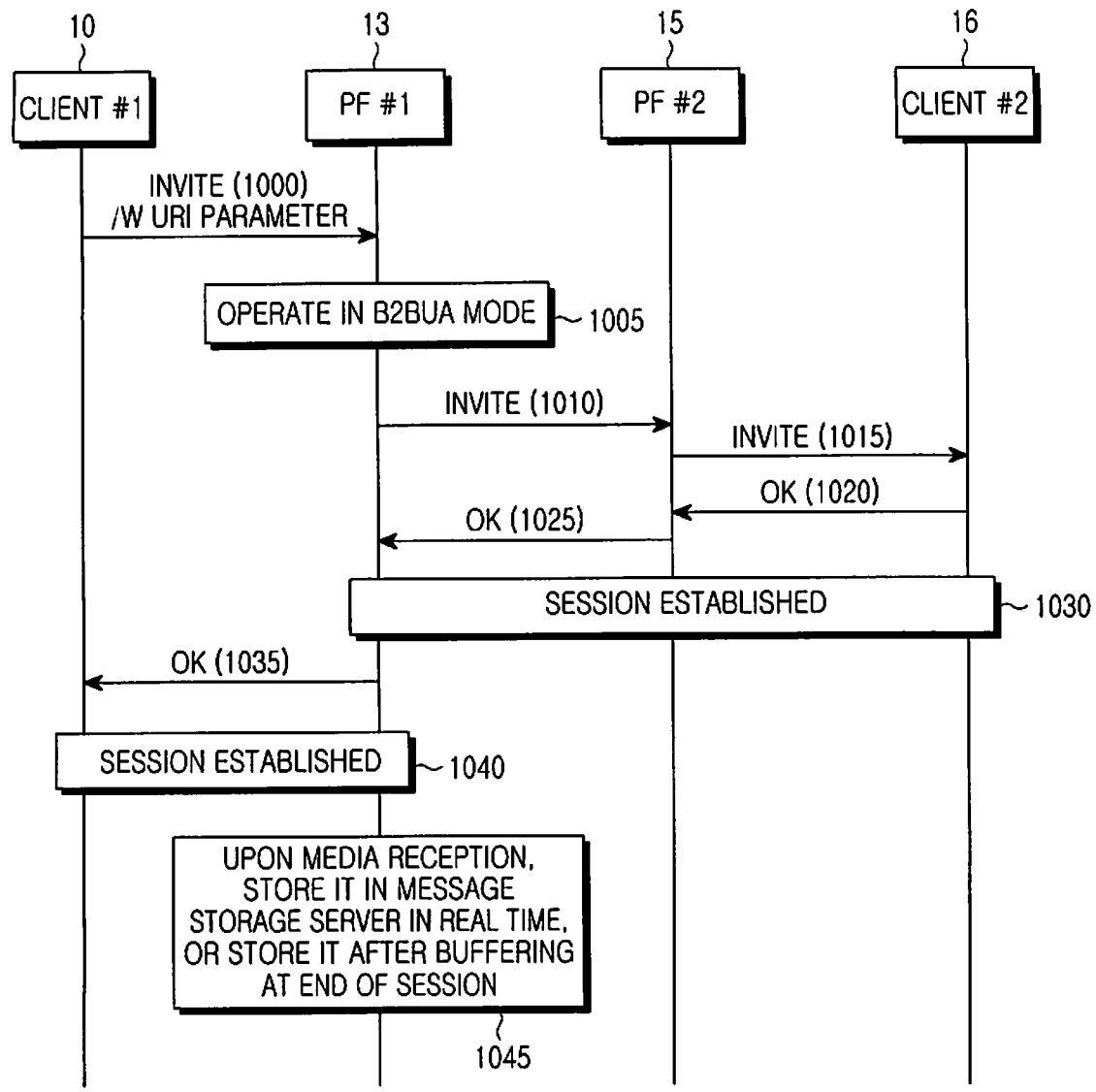
FIG. 10 is a flow diagram illustrating a process of requesting to store conversation via a PF as a sender of a session establishment request according to an embodiment of the present invention.

FIG. 10 illustrates a process in which a session is established using the URI parameter, as defined hereinabove, upon a session establishment request, and the media subsequently transmitted through the session is stored by the PF. Though the PF delivers the session establishment request to the recipient, the PF may operate in a B2BUA mode to establish sessions to the first and second clients, respectively, and to mediate media transmitted through these established sessions.

In step 1000, the first client 10 transmits a session establishment request to addresses of the first and second clients 10 and 16. A Request-URI of the session establishment request is an address of the second client 16, which is combined with the above-defined URI parameter. The session establishment request is transmitted to the first PF 13.

In step 1005, the first PF 13 determines, based on the set URI parameter value, that storage of the session is requested. The first PF 13 operates in the B2BUA mode, since the first PF 13 establishes sessions with the first and second clients 10 and 16, respectively, in order to store the sessions.

In steps 1010 and 1015, the first PF 13 in the B2BUA mode sets a session establishment request's Contact header and SDP body's connection information as an SIP address and an IP address, respectively, of the PF 13 and transmits the session establishment request to the address of the second client 16. The URI parameter included in the session establishment request received from the first client 10 is not included in the session establishment request transmitted in steps 1010 and 1015. The session establishment request is delivered to the second client 16 via the second PF 15.

In steps 1020 and 1025, the second client 16 returns an OK response message to the first PF 13 via the second PF 15 to indicate acceptance of the session establishment request. The OK response message is delivered to the first PF 13 via the second PF 15.

In step 1030, a session is established between the first PF 13 and the second client 16.

In step 1035, the first PF 13 transmits an OK response message to the first client 10 to indicate acceptance of the session establishment request. The first PF 13 sets the session establishment request's Contact header and the SDP body's connection information as an SIP address and an IP address, respectively, of the first PF 13.

In step 1040, a new session is established between the first PF 13 and the first client 10.

In step 1045, since the first PF 13 has established sessions with the first and second clients 10 and 16, respectively, and mediates these sessions, the first PF 13 may receive media transmitted between the first and second clients 10 and 16. Therefore, the first PF 13 stores the received media in the message storage server. When a 'target-media' parameter is included in the session establishment request received from the first client 10, the first PF 13 stores only the relevant media. Otherwise, the first PF 13 stores all received media. However, the storage method is subject to change according to the service policy. Upon receiving the media, the first PF 13 may store the received media in the message storage server 11 in real time, or may buffer the received media until the session ends, and then store the buffered media in the message storage server 11 when the session ends.

Figure 11:
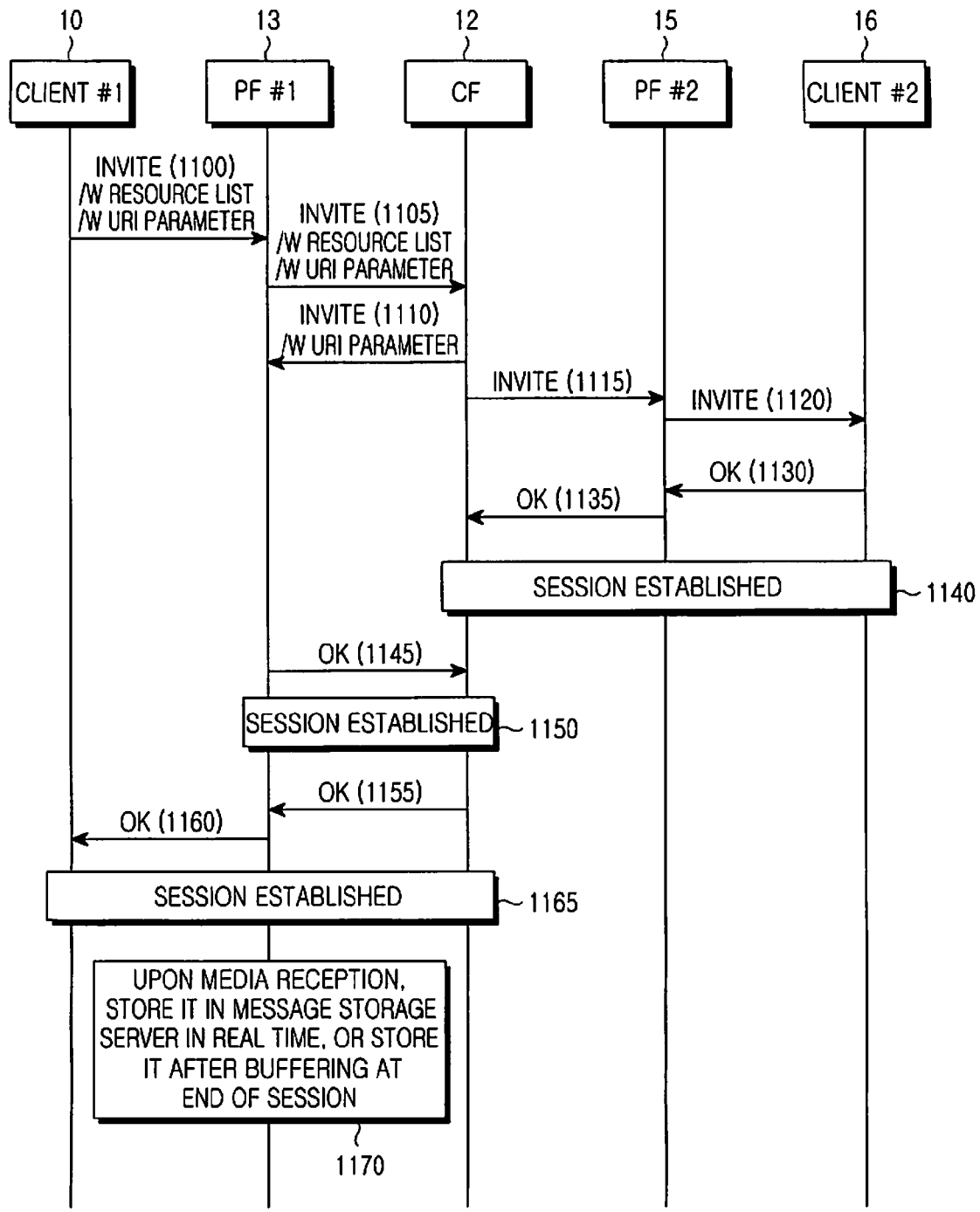
FIG. 11 is a flow diagram illustrating a process in which a session is established via a PF as a recipient of a session establishment request according to an embodiment of the present invention.

An operation of a PF as a recipient of the session establishment request is described as follows with reference to FIG. 11. FIG. 11 illustrates a process in which a PF and a receiving client are determined as targets or recipients to which sessions are to be established, and sessions are established upon a session establishment request with a conversation storage-related URI parameter included so that the PF may store the conversation.

In steps 1100 and 1105, since the targets of sessions to be established include the first PF 13 and the second client 16, the first client 10 establishes a conference session and invites the first PF 13 and the second client 16 to the conference. To this end, as described with reference to FIG. 9, the first client 10 enters a Request-URI of the session establishment request as an address of the CF 12, and enters a resource list with the address of the first PF 13 and the address of the second client 16 recorded in the body of the request. The address of the first PF 13 is combined with the conversation storage-related URI parameter. The session establishment request is delivered to the CF 12 via the first PF 13.

In steps 1110 and 1115, the CF 12 transmits session establishment requests to addresses of the first PF 13 and the second client 16, respectively, which are recorded in their resource lists. Since the address recorded in the resource list is used as a Request-URI of the session establishment request transmitted to the first PF 13, the combination with the URI parameter remained unchanged.

In steps 1130 and 1135, the second client 16 transmits an OK response message to the CF 12 to indicate acceptance of the received session establishment request.

In step 1140, a session is established between the CF 12 and the second client 16, and the second client 16 participates in the conference.

In step 1145, the first PF 13 transmits an OK response message to the CF 12 to indicate acceptance of the received session establishment request.

In step 1150, a session is established between the CF 12 and the first PF 13, and the first PF 13 participates in the conference.

In steps 1155 and 1160, the CF 12 transmits, to the address of the first client 10, an OK response message indicating successful establishment of the conference. The OK response message is delivered via the first PF 13.

In step 1165, a session is established between the CF 12 and the first client 10, and the first client 10 participates in the conference.

In step 1170, since the first PF 13 has participated in the same conferences as the conferences of the first and second clients 10 and 16, the first PF 13 may receive the media transmitted between these clients. Thus, the first PF 13 stores the received media in the message storage server 11. Regarding media storage, the first PF 13, depending on the service policy, may immediately store the received media in real time, or may buffer the received media and then subsequently store the buffered media all at once, when the session ends.

In the above-described process, when transmitting the session establishment request to the first PF 13 after receiving the conference establishment request, the CF 12 may determine a type of media of the session to be established to the first PF 13. Herein, the CF 12 may perform a selected one of two possible schemes according to the service policy.

In the case of the first scheme, when establishing a session to the first PF 13, the CF 12 establishes a session including the same type of media as the media the second client 16 has accepted, among the media requested by the first client 10. For example, if the media requested by the first client 10 include audio and video, and the second client 16 has accepted both media types, then the CF 12 establishes a session including audio and video with the first PF 13. However, if a particular media type is indicated by a 'target-media' parameter regardless of the types of the media received through the session, the first PF 13 stores only media corresponding to the indicated media type. However, if the 'target-media' parameter is not used, all media received through the session are stored.

In the case of the second scheme, the CF 12 checks a resource list of the session establishment request for conference, received from the first client 10. If the address of the first PF 13 in the resource list is not combined with the 'target-media' parameter, the CF 12 follows the first scheme. In this case, the first PF 13 stores all of the received media. If the address of the first PF 13 in the resource list is combined with the 'target-media' parameter, the CF 12 establishes a session of the media type indicated by the 'target-media' parameter, with the first PF 13. In this case, the first PF 13 merely stores the received media, since the first PF 13 only receives the media of the type indicated by the 'target-media' parameter.

Figure 12:
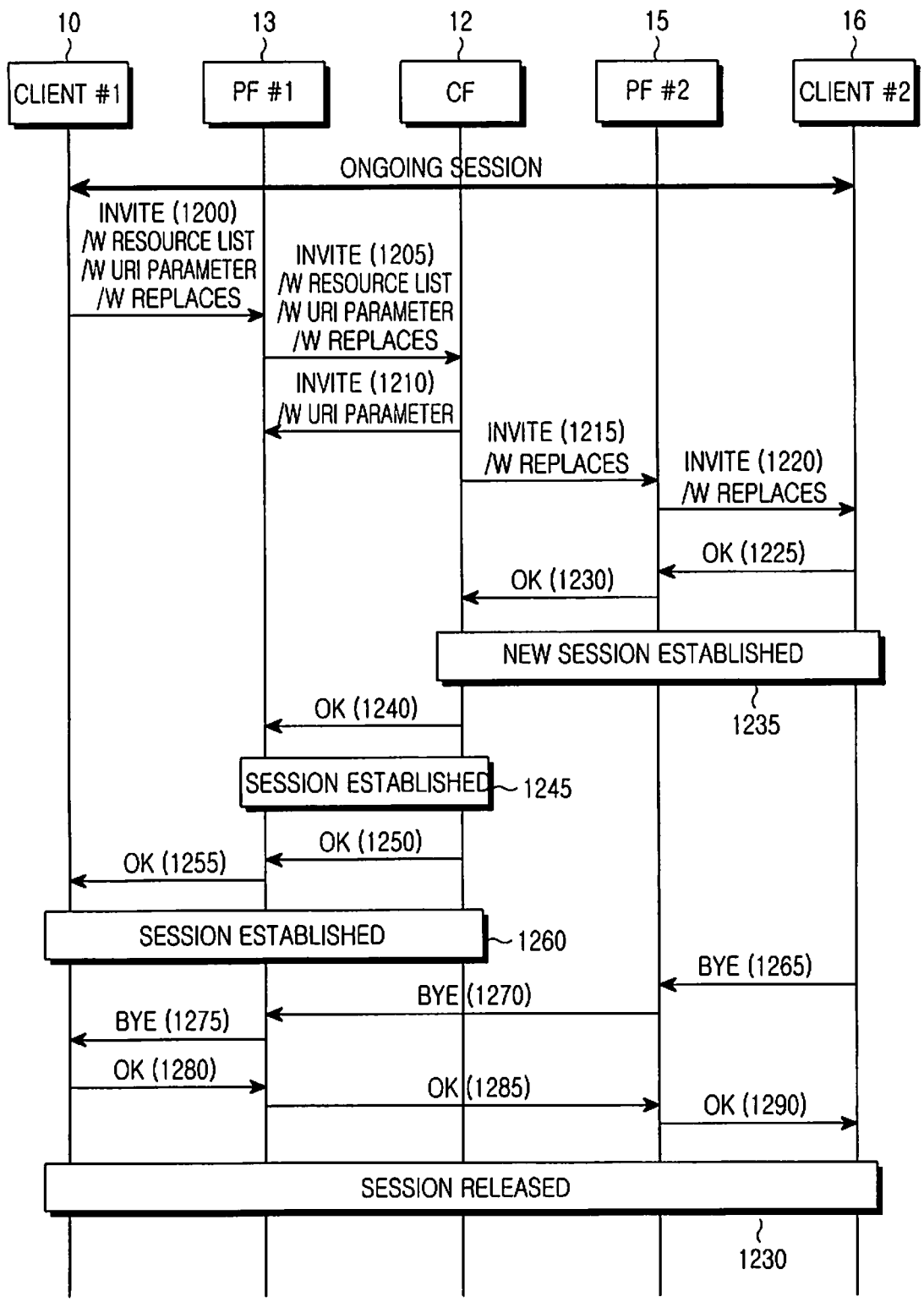
FIG. 12 is a flow diagram illustrating a process of requesting to store conversation regarding a 1:1 session according to an embodiment of the present invention.

A process of requesting storage of a conversation during a session in progress is described as follows with reference to FIG. 12. FIG. 12 illustrates a method for allowing the PF to store a session upon a request of the first client 10 in a case where a session is directly established between the first and second clients 10 and 16 as conversation storage is not set in the XDMS user preference. Steps other than steps 1200, 1215, 1220 and 1265 to 1230 in FIG. 12 have already been described with reference to FIG. 11, so a description thereof is omitted for simplicity.

In step 1200, since the session established between the first and second clients 10 and 16 is not a conference, the CF 12 is not involved in the session. In order for the first PF 13 to receive media, the first PF 13 and the first and second clients 10 and 16 participate in the same conference. The first client 10 transmits a conference establishment request to the CF 12. Likewise, the first client 10 records addresses of the first PF 13 and the second client 16 in a resource list in a body part of the session establishment request, combines the address of the first PF 13 with a conversation storage-related URI parameter, and combines the address of the second client 16 with a Replaces parameter using the "?" algorithm. The Replaces parameter's value is a dialog ID of the ongoing session.

In steps 1215 and 1220, the CF 12 enters a Replaces header with a dialog ID of the ongoing session defined as a value of the ongoing session, in the session establishment request, and transmits the session establishment request to the second client 16. The session establishment request is delivered to the second client 16 via the second PF 15.

In steps 1265 to 1275, the second client 16 transmits, to the first client 10, a session end request (BYE) for the ongoing session immediately after the session is established to the CF 12 based on the Replaces header. The session end request is transmitted to the first client 10 via the second PF 15 and the first PF 13.

In steps 1280 to 1290, the first client 10 transmits an OK response message to the second client 16 in response to the session end request. The OK response message is delivered to the second client 16 via the first and second PFs 13 and 15.

In step 1230, the session in progress between the first and second clients 10 and 16 ends.

In the process described with reference to FIG. 12, the Replaces parameter is combined with the address of the second client 16 in the resource list. However, the Replaces parameter may alternatively be combined with the address of the first client 10. In this case, a session end request for the session in progress is eventually the same except that it is transmitted from the first client 10 to the second client 16. In addition, when requesting the first PF 13 to establish a session, the CF 12 follows one of the above-described first and second schemes according to the service policy as a scheme of determining a type of media in the session. The session that is established between the CF 12 and the first PF 13 according to one of the first and second schemes may be established to always include the same media as the media of the session established between the CF 12 and the second client 16, or to include only the media indicated by a 'target-media' parameter when the 'target-media' parameter is present.

Figure 13:
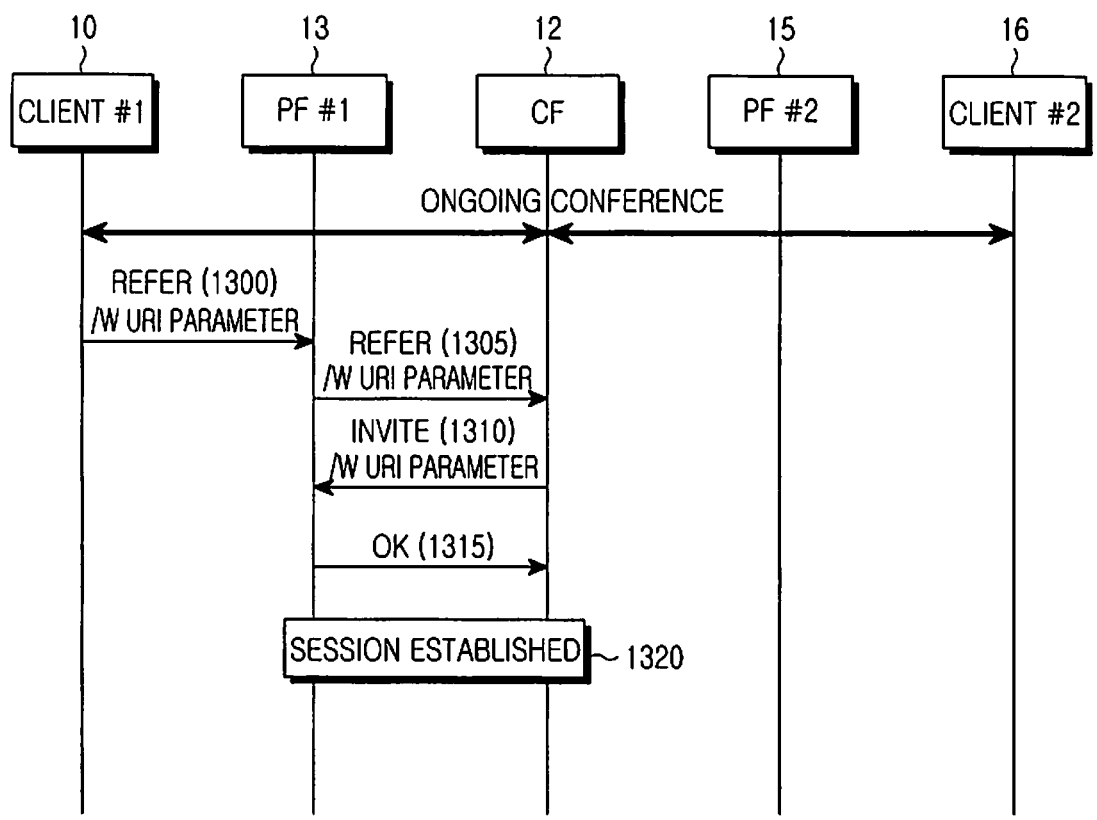
FIG. 13 is a flow diagram illustrating a process of requesting to store conversation regarding a conference according to an embodiment of the present invention.

A process of requesting storage of a conversation regarding a conference is described as follows with reference to FIG. 13. FIG. 13 illustrates a process of storing media in the message storage server 11 upon a request of the first client 10 in the case where a session is established, as a conference, between the first and second clients 10 and 16 via the CF 12 and the two clients 10 and 16 are participating in the conference.

In step 1300, the first client 10 generates a REFER message including an address of the ongoing conference defined as a reception address, and transmits the REFER message. An address of the first PF 13 is combined with the conversation storage-related parameter and entered in a Refer-To header of the REFER message. A 'method' parameter in the Refer-To header may be either omitted or entered, and the 'method' parameter value is set as "INVITE" when entered. Table 9 includes an example of a REFER message transmitted from the first client 10. The REFER message is delivered to the CF 12 via the first PF 13 in step 1305.

TABLE 9

REFER sip:conference@domain.com SIP/2.0
From <sip:sending_client@domain.com>;tag=z123
...
Refer-To: <sip:participating_function@domain.com;store=ture;target-media=audio;method=INVITE>
...

In step 1310, the CF 12 transmits a session establishment request with an address of the first PF 13 designated as a reception address in the Refer-To header. The conversation storage-related parameters combined with the address of the first PF 13 are included intact in the session establishment request.

In step 1315, the first PF 13 transmits an OK response message to the CF 12 to indicate acceptance of the session establishment request.

In step 1320, a new session is established between the CF 12 and the first PF 13, and the first PF 13 participates in the ongoing conference.

In FIG. 13, when requesting the first PF 13 to establish a session, the CF 12 follows any one of the above-described first and second schemes according to the service policy as a scheme of determining a type of media in the session. The session that is established between the CF 12 and the first PF 13 according to one of the first and second schemes, may be established to always include the same media as those of the session established between the CF 12 and the second client 16, or to include only the media indicated by a 'target-media' parameter when the 'target-media' parameter is present.

Although the address of the CF 12 is described hereinabove as a reception address of the REFER message transmitted from the first client 10, a similar effect can be obtained even when the address of the first PF 13 is entered as the reception address. In this case, when the address of the first PF 13 is entered in Request-URI, the address of the first PF 13 is combined with the conversation storage-related parameters. In addition, the address of the CF 12 and the 'method' parameter are entered in the Refer-To header. Thus, upon receiving the REFER message, the first PF 13 transmits a session establishment request to the CF 12, and the CF 12 accepts the session establishment request, thereby establishing a session between the CF 12 and the first PF 13. Even in this case, when establishing a session to the CF 12, the first PF 13 may follow one of the above-described first and second schemes to determine a media type allowable by the session, i.e., the session that is established between the CF 12 and the first PF 13 according to one of the first and second schemes may be established to always include the same media as those of the session established between the CF 12 and the second client 16, or to include only the media indicated by a 'target-media' parameter when the 'target-media' parameter is present.

Figure 14:
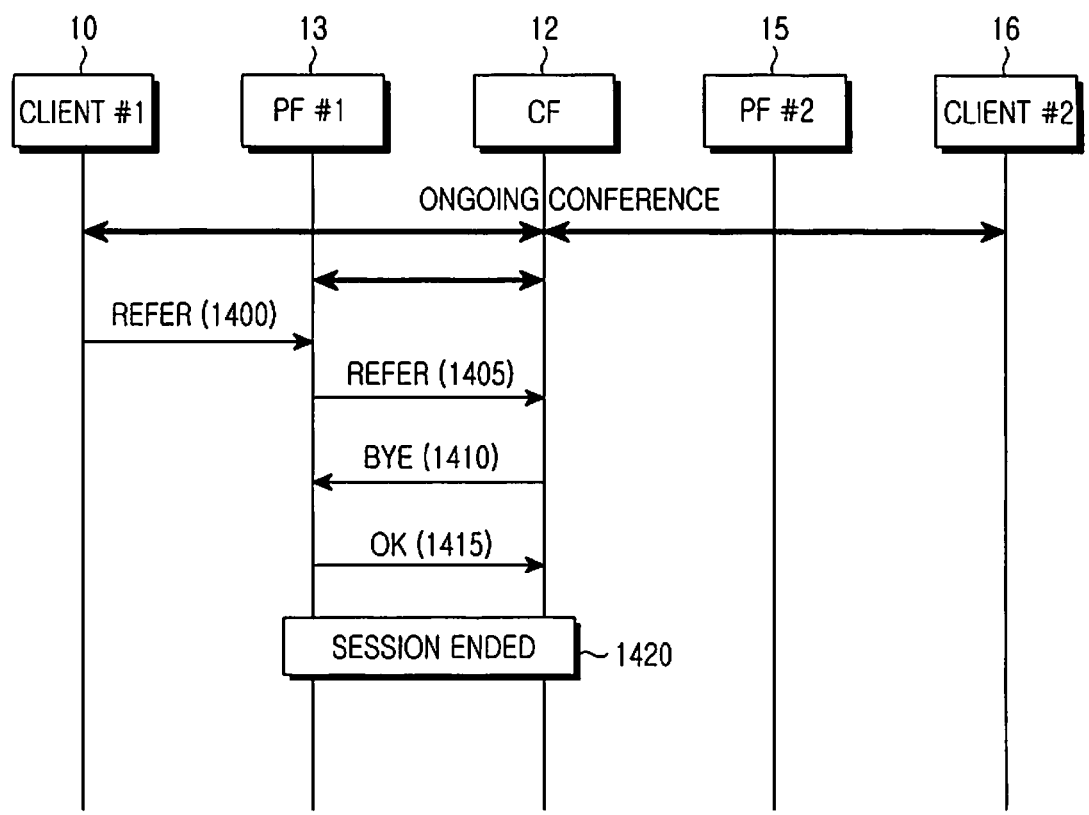
FIG. 14 is a flow diagram illustrating a process of requesting to stop conversation storage during a session in progress according to an embodiment of the present invention.

A process of requesting to cease conversation storage during a session in progress is described as follows with reference to FIG. 14. FIG. 14 illustrates a process of stopping media storage upon a user's request in the case where a sending client, a receiving client, and a sending PF are participating in the same conference and the PF stores a message in the message storage server.

In steps 1400 and 1405, the first client 10 transmits a REFER message to an address of the ongoing conference. A Refer-To header of the REFER message includes an address of the first PF 13, and a 'method' parameter is set as "BYE." The REFER message is delivered to the CF 12 via the first PF 13.

In step 1410, the CF 12 transmits a session end request to the first PF 13. In step 1415, the first PF 13 transmits an OK response message to the CF 12 to indicate acceptance of the session end request. In step 1420, the session that has been in progress between the CF 12 and the first PF 13 ends, and the first PF 13 leaves the conference.

In the process described with reference to FIG. 14, the first client 10 transmits a REFER message to the CF 12. However, the first client 10 may alternatively transmit the REFER message to the first PF 13. In this case, the conference address is entered in the Refer-To header, and the 'method' parameter is still set as "BYE." Upon receiving the REFER, the first PF 13 transmits a session end request to the CF 12, and the CF 12 accepts the session end request, causing the first PF 13 to leave the conference.

As is apparent from the foregoing description, according to embodiments of the present invention, a conversation may be stored in a message storage server on the network and the storage may stop based on a user's real-time request, rather than based on a preset user preference in the CPM service. Herein, the target that can be stored as conversation may include a pager mode message, a large message, and the media delivered through a session. In this manner, according to embodiments of the present invention, storage may be performed for only the message or media that a user wants to store, making it possible to reduce the additional costs for storage operations and to more efficiently use the limited storage space.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method, performed by a first server in a Converged Internet Protocol (IP) Messaging (CPM) system, for storing a conversation upon a request of at least one client, the method comprising:
after a first session for transmitting multimedia data is established between a first client and a second client directly through a second server, receiving, from the first client, a message including conversation store request information;
determining whether the conversation store request information is included in the received message;
transmitting a session establishment request message to the second client, based on the determining; and
after a second session is established between the first client and the second client, through the first server, storing, media transmitted between the first and the second clients through the first server mediating the second session,
wherein the first session through the second server is released when the second session through the first server is established.

2. The method of claim 1, wherein the conversation store request information includes at least one of information indicating whether to store a conversation including one of a pager mode message, a large message, and the media, information about the first session, and a type of media to be stored.

3. The method of claim 1, wherein the session establishment request message is for replacing the first session with the second session, and
wherein the session establishment request message includes at least one of information about the first session and an address of the first server.

4. The method of claim 3, wherein the session establishment request message includes a replace header in which the information about the first session is set.

5. The method of claim 1, wherein the message including the conversation store request information is any one of a Session Initiation Protocol (SIP) MESSAGE and an SIP PUBLISH message, and
wherein the session establishment request message is an SIP INVITE message.

6. The method of claim 1, wherein storing the media includes, upon receiving media corresponding to the conversation store request information, storing the received media in a message storage server in real time.

7. The method of claim 1, wherein storing the media comprises:
upon receiving media corresponding to the conversation store request information, buffering the received media until the second session is ended; and
storing the buffered media in a message storage server, when the second session is ended.

8. The method of claim 1, further comprising:
transmitting, when the conversation store request information is included in the received message, to a Controlling Function (CF) managing a conference session, a session establishment request for replacing the first session with a new session with the CF; and
establishing a session with the CF, when a session is established between the CF and each of the first and second clients.

9. The method of claim 8, wherein the session establishment request message for replacing the first session with the new session with the CF includes an addresses of the first and an address of the second client.

10. A method, performed by a first client in a Converged-Internet Protocol (IP) Messaging (CPM) system, for storing a conversation upon a user's request, the method comprising:
after a first session for transmitting multimedia data is established between the first client and a second client directly through a second server, receiving a request to store at least one media transmitted between the first client and the second client;
upon receiving the request to store at least one media, generating a message including conversation store request information for requesting to store the requested media;
transmitting the generated message to a first server for storing the at least one media;
receiving a session establishment request message from the first server;
establishing a second session between the first client and the second client through the first server; and
releasing the first session through the second server, after establishing the second session through the first server.

11. The method of claim 10, wherein the conversation store request information includes at least one of information indicating whether to store a conversation including one of a pager mode message, a large message, and the media, information about the first session, and a type of media to be stored.

12. The method of claim 10, wherein the message including the conversation store request information is any one of a Session Initiation Protocol (SIP) MESSAGE and an SIP PUBLISH message.

13. The method of claim 10, wherein the session establishment request message includes an address of the first server.

14. The method of claim 10, wherein releasing the first session comprises:
receiving, from the second client, an end request message for the first session, when the second client receives, from the first server, a session establishment request message for replacing the first session with the second session; and
transmitting, to the second client, a response message to the end request message.

15. A first server for storing a conversation upon a user's request in a Converged-IP Messaging (CPM) system, the first server comprising:
a transmitter-receiver for transmitting and receiving messages to/from a first client and a second client;
a processor for, after a first session for transmitting multimedia data is established between the first client and the second client directly through a second server, receiving, from the first client, a message including conversation store request information, determining whether the conversation store request information is included in the received message, transmitting a session establishment request message to the second client, based on the determining, and after a second session is established between the first client and the second client, through the first server, controlling for storing media transmitted between the first and the second clients through the first server mediating the second session; and
a memory for storing the media transmitted between the first client and the second client through the second session,
wherein the first session through the second server is released when the second session through the first server is established.

16. The first server of claim 15, wherein the conversation store request information includes at least one of information indicating whether to store a conversation including one of a pager mode message, a large message, and the media, information about the ongoing session, and a type of media to be stored.

17. The first server of claim 15, wherein one of the session establishment request messages is a session establishment request message for replacing the first session between the first and second clients with the second session, and
wherein the session establishment request message includes at least one of information about the first session and an address of the first server.

18. The first server of claim 17, wherein the session establishment request message includes a replace header in which the information about the first session is set.

19. A first client for storing a conversation upon a user's request in a Converged-Internet Protocol (IP) Messaging (CPM) system, the first client comprising:
a transmitter-receiver for transmitting and receiving a message, and exchanging multimedia data transmitted through a session; and
a processor for, after a first session for transmitting multimedia data is established between the first client and a second client directly through a second server, and upon receiving a request for storing at least one media transmitted between the first client and the second client, generating a message including conversation store request information for requesting to store the requested media, transmitting the generated message to a first server for storing the at least one media, receiving a session establishment request message from the first server, establishing a second session between the first client and the second client through the first server, and releasing the first session established between the first client and the second client through the second server, after completely establishing the second session between the first and second clients through the first server such that the first server stores media transmitted between the first client and the second client through the first server mediating the second session.

20. The first client of claim 19, wherein the conversation store request information includes at least one of information indicating whether to store a conversation including one of a pager mode message, a large message, and the media, information about the established session, and a type of media to be stored.

* * * * *